(12) United States Patent
Ross, Jr.

(10) Patent No.: US 7,174,368 B2
(45) Date of Patent: Feb. 6, 2007

(54) ENCRYPTED E-MAIL READER AND RESPONDER SYSTEM, METHOD, AND COMPUTER PROGRAM PRODUCT

(75) Inventor: Robert C. Ross, Jr., Mobile, AL (US)

(73) Assignee: Xante Corporation, Mobile, AL (US)

( * ) Notice: Subject to any disclaimer, the term of this patent is extended or adjusted under 35 U.S.C. 154(b) by 210 days.

(21) Appl. No.: 10/103,713

(22) Filed: Mar. 25, 2002

(65) Prior Publication Data

US 2002/0143885 A1 Oct. 3, 2002

Related U.S. Application Data

(60) Provisional application No. 60/278,755, filed on Mar. 27, 2001.

(51) Int. Cl.
*G06F 15/16* (2006.01)

(52) U.S. Cl. .................. 709/207; 709/206; 709/229; 713/202; 713/155; 713/162; 705/74

(58) Field of Classification Search ............... 709/206, 709/207, 217, 229; 713/168, 201, 155, 162, 713/202; 705/74
See application file for complete search history.

(56) References Cited

U.S. PATENT DOCUMENTS

| | | | | |
|---|---|---|---|---|
| 5,696,827 A | * | 12/1997 | Brands | 380/30 |
| 5,805,803 A | * | 9/1998 | Birrell et al. | 713/201 |
| 5,862,327 A | * | 1/1999 | Kwang et al. | 709/203 |
| 5,935,249 A | * | 8/1999 | Stern et al. | 713/201 |
| 6,023,510 A | * | 2/2000 | Epstein | 705/74 |
| 6,061,448 A | * | 5/2000 | Smith et al. | 380/282 |
| 6,128,389 A | * | 10/2000 | Chan et al. | 380/247 |
| 6,151,679 A | * | 11/2000 | Friedman et al. | 713/201 |

(Continued)

*Primary Examiner*—William Vaughn
*Assistant Examiner*—Thanh T Nguyen
(74) *Attorney, Agent, or Firm*—Venable LLP; Ralph P. Albrecht

(57) ABSTRACT

A system, method, and computer program product for providing a encrypted email reader and responder is described. The method of distributing and initializing an encrypted electronic mail (email) software application for exchanging secure email, can include: obtaining by a first user a license for an email client software application program having public/private encryption; requesting by the first user that a second user download a reader/responder software application program in order to exchange encrypted email between the first user and the second user; downloading and installing the reader/responder software application program by the second user; sending an email by the second user to the first user including embedding an unencrypted public key by using a send key function of the reader/responder software application program; receiving the email from the second user by the first user, wherein the unencrypted public key is embedded in the email; responding by the first user by sending a second email to the first user, where the reader/responder software application program encrypts a message of the second email into an encrypted message using the unencrypted public key of the second user; receiving the second email by the second user with the encrypted message as an attachment from the first user into a third party email software application program, wherein the third party email software application program is different from the reader/responder software application program and the email client software application program; and opening by the second user the attachment to execute the reader/responder software application program operative to allow a user without the email client software to read and respond to encrypted email created and sent from a user having the email client software.

20 Claims, 14 Drawing Sheets

U.S. PATENT DOCUMENTS

| | | |
|---|---|---|
| 6,185,681 B1 | 2/2001 | Zizzi |
| 6,202,157 B1 * | 3/2001 | Brownlie et al. ............ 713/201 |
| 6,240,513 B1 * | 5/2001 | Friedman et al. ........... 713/152 |
| 6,289,105 B1 * | 9/2001 | Murota ....................... 380/286 |
| 6,292,895 B1 | 9/2001 | Baltzley |
| 6,317,831 B1 * | 11/2001 | King ........................... 713/171 |
| 6,332,025 B2 * | 12/2001 | Takahashi et al. .......... 380/281 |
| 6,343,318 B1 | 1/2002 | Hawkins et al. |
| 6,351,536 B1 * | 2/2002 | Sasaki ......................... 380/44 |
| 6,356,937 B1 * | 3/2002 | Montville et al. ........... 709/206 |
| 6,389,533 B1 * | 5/2002 | Davis et al. ................. 713/162 |
| 6,442,600 B1 * | 8/2002 | Anderson ................... 709/217 |
| 6,546,486 B1 * | 4/2003 | Perlman et al. ............. 713/153 |
| 6,600,823 B1 * | 7/2003 | Hayosh ....................... 380/51 |
| 6,636,975 B1 * | 10/2003 | Khidekel et al. ........... 713/202 |
| 6,640,301 B1 * | 10/2003 | Ng .............................. 713/156 |
| 6,681,108 B1 * | 1/2004 | Terry et al. ............... 455/412.2 |
| 6,721,784 B1 * | 4/2004 | Leonard et al. ............. 709/206 |
| 6,760,752 B1 * | 7/2004 | Liu et al. .................... 709/206 |
| 6,785,721 B1 * | 8/2004 | Immerman et al. ......... 709/220 |
| 6,807,633 B1 * | 10/2004 | Pavlik ......................... 713/170 |
| 2001/0007993 A1 * | 7/2001 | Wu .............................. 709/207 |
| 2002/0007453 A1 * | 1/2002 | Nemovicher ................ 713/155 |
| 2002/0116508 A1 * | 8/2002 | Khan et al. ................. 709/229 |
| 2002/0120776 A1 * | 8/2002 | Eggebraaten et al. ....... 709/246 |
| 2004/0025057 A1 * | 2/2004 | Cook .......................... 713/201 |

* cited by examiner

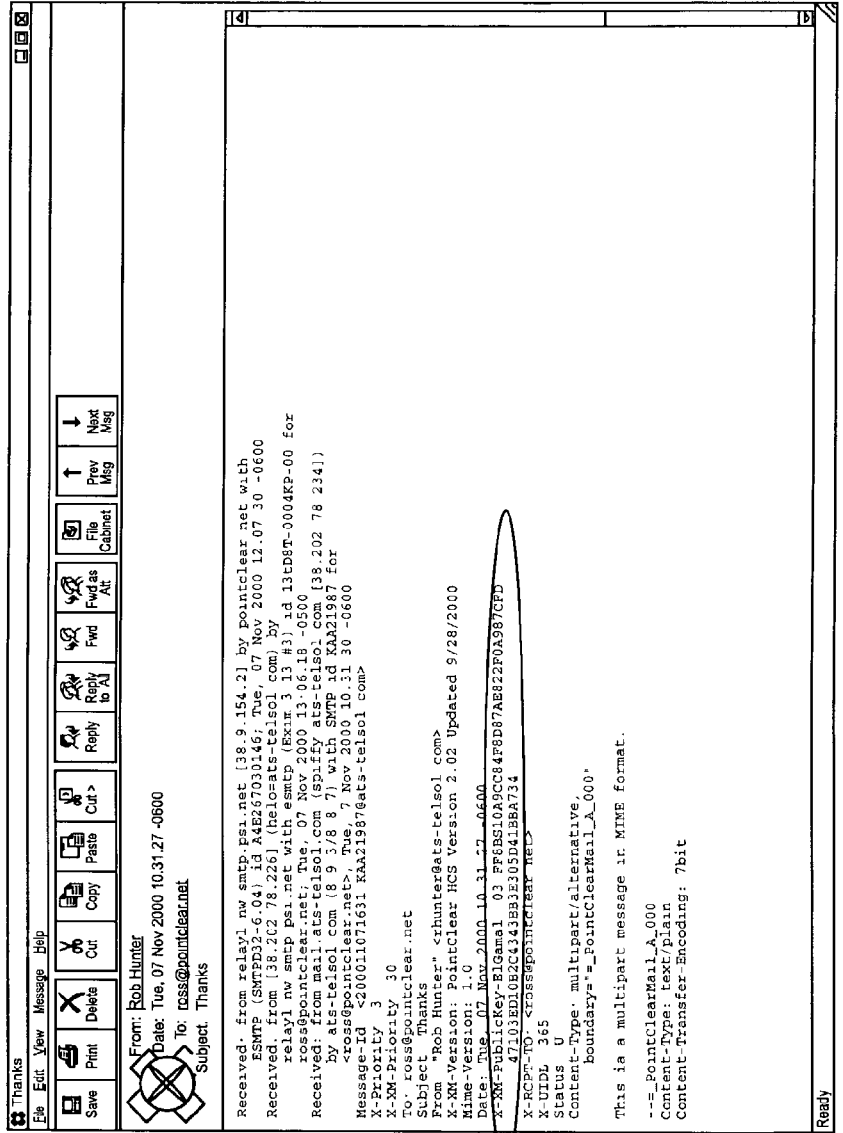

ENCRYPTED E-MAIL READER AND RESPONDER SYSTEM, METHOD, AND COMPUTER PROGRAM PRODUCT

CROSS-REFERENCE TO RELATED APPLICATION

The present application is related to U.S. patent application Ser. No. 60/278,755, filed Mar. 27, 2001 "Encrypted E-Mail Reader and Responder System, Method, and Computer Program Product," to Robert C. Ross, of common assignee to the present invention, now expired. U.S. patent application Ser. No. 09/714,997, filed Nov. 20, 2000 entitled "System, Method and Computer Program Product for Providing a Multi-User Email System," to Robert C. Ross, of common assignee to the present invention, presently pending, and related U.S. Provisional Patent Application No. 60/166,409, filed Nov. 19, 1999 entitled "System, Method and Computer Program Product for Providing a Multi-User Email System," to Robert C. Ross, also of common assignee to the present invention, now expired, the contents of which are incorporated herein by reference in their entirety.

BACKGROUND OF THE INVENTION

1. Field of the Invention

The present invention relates to electronic mail (e-mail) systems and more particularly, to encrypted e-mail systems.

2. Related Art

Electronic mail, also known as e-mail, is a widely used means of communicating between communication devices such as computers. A conventional e-mail system enables sending e-mail notes or e-mail messages much like a conventional postal letter from a source to a destination. For example, a sender could send an e-mail message including a return e-mail address to a receiver at the receiver's e-mail address on another computer through a network connecting the computers. E-mail messages provide several advantages over conventional postal mail, such as, for example, faster preparation time, faster delivery time, a simpler addressing scheme than using name, street address or post office box, city, state and zip code, and lower cost. E-mail systems can provide an efficient means of distributing information internal to and external from an enterprise or business. However, conventional e-mail systems have limitations when used in, e.g., a manufacturing plant or production environment such as, e.g., a hospital, or retail business. For example, conventional e-mail systems require that each user have a computer with which to access the e-mail system. In a production or manufacturing environment, a machine operator often will not have access to a computer. Also, it may be unsafe in certain environments to permit a worker to be distracted by e-mail while performing tasks such as, e.g., monitoring a mission critical operation, such as where a worker is operating heavy machinery or a nurse in a hospital. Limitations of conventional e-mail systems can prevent many users within organizations from, e.g., accessing important corporate information, which is most efficiently distributed over e-mail.

Historically, e-mail messages have included primarily text. Eventually, users were able to attach files for delivery along with an e-mail textual message. Such attached files are often called "attachments." Many e-mail systems support attaching multiple documents to an e-mail message. Unfortunately, when an e-mail user desires to forward an attachment, the attachment is conventionally forwarded along with the message containing it causing the forwarded e-mail with attachment to be encapsulated within the new e-mail.

One type of e-mail system is a client/server e-mail system. The e-mail system can use a centralized post office box that resides on a server somewhere on the network to which client e-mail user computers are attached. The post office box can be used, e.g., to store a message from a sender which can then forward the message later to a temporarily disconnected addressed receiver. The centralized post office can also permit messages to be centrally backed up on a periodic basis. With a client/server e-mail system, a portion of the e-mail generation program can reside on a client's computer (the computer of the sender or receiver), and another portion of the e-mail system can reside on a server computer. E-mail application software can run on a variety of operating systems and computer system platforms. Conventionally, e-mail messages are stored on the central server computer and are accessed via the client user computers.

Another type of client/server e-mail system is known as "groupware." Groupware enables functions in addition to the communication capability of e-mail including, for example, project management, location independent cooperation and information accessibility links.

Examples of e-mail systems include, for example, Lotus cc:Mail available from IBM, Outlook, Exchange, and MS Mail available from MICROSOFT of Redmond, Wash., USA, PROFS and OFFICEVISION available from IBM of Armonk, N.Y. USA, All-In-One from Compaq of Houston, Tex., USA, online service provider integrated e-mail systems such as, e.g., that provided by AMERICA ONLINE (AOL) of Vienna, Va., USA, the Internet Protocol's Simple Mail Transfer Protocol (SMTP), and various Internet based e-mail systems such as those available from JUNO and NETZERO. Examples of groupware include Lotus Notes available from IBM, Exchange available from MICROSOFT, Collabra Share available from NETSCAPE, and Groupwise available from NOVELL.

Early e-mail systems sent messages to users within an organization known as an intranet system, with little consideration taken to interacting with other e-mail systems or networks. An intranet is a term often used to describe a stand alone network or group of networks which includes a related group of senders and receivers, such as, for example, the employees of a commercial company.

Some intranet e-mail systems are equipped to interoperate with other e-mail systems. Computers coupled by a network communicate by using communication software programs which in turn use a communication language or "protocol." Some e-mail systems are implemented using a so-called "open systems" communications method such as the transmission control protocol/internet protocol (TCP/IP) suite of protocols. The TCP/IP protocol suite includes the SMTP e-mail functionality already mentioned.

An internet (i.e. with a lower case "i") is a network which couples two separate networks to one another. The global Internet (i.e. with a capitalized "I") is an internet that grew out of a U.S. Defense Advanced Research Projects Agency (DARPA) project. The Internet originally served a largely technical audience composed of the military, government agencies, and academic researchers and scientists. The original goals of the project were to allow researchers to share computing resources and to exchange information, regardless of their locations, and to create a resilient, fault-tolerant wide area network (WAN) for military communications. The global Internet implements communication using the TCP/IP communications protocols.

On-line service providers originally provided e-mail system access to individuals via modem connections. On-line service providers include, for example, American On Line (AOL), CompuServe, and Prodigy. Online services traditionally created offerings targeted toward home computer users. These providers often provided proprietary e-mail systems to connect their users to one another. In time, users on proprietary on-line services, were able to send messages to users on other e-mail services via the Internet.

During the mid-1990's, commercial enterprises and individuals increasingly discovered the benefits of being connected to the Internet, eventually creating a mass-market phenomenon. Today, although access is limited in some areas, most countries have ties to the Internet. Thus, the Internet has enabled widespread, standardized intercommunication between users of disparate e-mail systems.

Small and medium sized businesses have many users, which do not have access to a computer with which to send and receive e-mail. Workers in various professions including, e.g., healthcare workers in a hospital and retail, because of their jobs, may not have access to conventional email. It is desirable that all employees of a business have access to e-mail resources for such purposes as, e.g., for efficient distribution of information to employees from an employer. In many cases, it can be desirable that the employer not be required to purchase a computer for use by each of the employees. It is also desirable that the employer be able to filter out any junk e-mail, commonly known as "spam," being sent to the employees. It is also desirable that employees such as, e.g., in a retail business, production, or operations such as a hospital, not be permitted to access their e-mail at all times in order to maintain high worker productivity.

Conventionally, when a sending user of an e-mail desires to send an encrypted e-mail message to a receiving user, unfortunately, the sending and receiving users must either be on compatible e-mail systems or must go through complex set up and configuration procedures prior to sending the encrypted e-mail message. Conventional e-mail systems can be complex to configure.

Conventional e-mail systems lack standardization in handling of encryption.

Thus, what is needed in an improved e-mail system that allows for the encryption, sending, receiving and decryption of e-mail in a heterogeneous network environment.

SUMMARY OF THE INVENTION

A method, system, and computer program product are provided that enable receiving users on a different e-mail system than a sending user to read and respond to encrypted email.

In an exemplary embodiment of the present invention a reader-responder module can allow a receiving user to read and respond to an encrypted e-mail created by a sending user using a different type of e-mail system than the e-mail system used by the receiving user.

In an exemplary embodiment, the receiving user, using the reader-responder module, can be provided with a sub-set of the functionality of the sending user's e-mail system. In an exemplary embodiment, the sub-set of functionality can include reading messages from users of the sending user's e-mail system. In an exemplary embodiment, the sub-set of functionality can include sending messages to users of the sending user's e-mail system, such as, e.g., the sending user.

In an exemplary embodiment, use of the reader-responder module by the receiving user can be allowed for no fee.

Advantageously, the receiving user, in one exemplary embodiment, in exchange for a transaction amount, can be provided with the full set of functionality of the sending user's e-mail system.

In another exemplary embodiment, a method, system, and computer program product can be provided that can enable a receiving user of a first e-mail system to read and respond to an e-mail sent from a sending user, where the e-mail was created on a second e-mail system, and where proprietary features of the second e-mail system are provided to the receiving user.

In an exemplary embodiment, the proprietary features are encryption features. In an exemplary embodiment, the encryption features support a 128 bit public/private encryption system. In an exemplary embodiment of the present invention a reader-responder module can allow the receiving user to read and respond to the e-mail created by the sending user on the second e-mail system.

In an exemplary embodiment, the receiving user, using the reader-responder module, can be provided with a sub-set of the functionality of the second e-mail system. In an exemplary embodiment, the sub-set of functionality can include exchanging messages with users of the second e-mail system. In an exemplary embodiment, the sub-set of functionality can include creating and sending messages to users of the second e-mail system.

In an exemplary embodiment, use of the reader-responder module by the receiving user can be provided for a nominal, or no fee.

Advantageously, the receiving user, in one exemplary embodiment, in exchange for a transaction amount, can be provided with the full set of functionality of the second e-mail system.

In an exemplary embodiment of the present invention, a method of distributing and initializing an encrypted electronic mail (email) software application for exchanging secure email, includes the steps of: obtaining by a first user a license for an email client software application program having public/private encryption; requesting by the first user that a second user download a reader/responder software application program in order to exchange encrypted email between the first user and the second user; downloading and installing the reader/responder software application program by the second user; sending an email by the second user to the first user including embedding an unencrypted public key by using a send key function of the reader/responder software application program; receiving the email from the second user by the first user, wherein the unencrypted public key is embedded in the email; responding by the first user by sending a second email to the first user, where the reader/responder software application program encrypts a message of the second email into an encrypted message using the unencrypted public key of the second user; receiving the second email by the second user with the encrypted message as an attachment from the first user into a third party email software application program, wherein the third party email software application program is different from the reader/responder software application program and the email client software application program; and opening by the second user the attachment to execute the reader/responder software application program operative to allow a user without the email client software to read and respond to encrypted email created and sent from a user having the email client software.

In one exemplary embodiment, the method further comprises: viewing by the second user the encrypted message using the reader/responder software application program including decoding the encrypted message using a private key for the second user.

In another exemplary embodiment, the method further comprises: saving information about the first user into an address book database along of the second using along with an unencrypted public key for the first user.

In yet another exemplary embodiment of the present invention, the method further comprises: creating a new secure email including an encrypted message by the second user to send to at least one of the first user and any other user of the email client software application program to which the second user has emailed a public key and from which the second user has received a response email.

In another exemplary embodiment, the email client software application program can use at least 128-bit public/private encryption.

In another exemplary embodiment of the present invention, a data processing system operative to distribute and initialize an encrypted electronic mail (email) software application for exchanging secure email, can include: a license module operative to obtain by a first user a license for an email client software application program having public/private encryption; a request module operative to request by the first user that a second user download a reader/responder software application program in order to exchange encrypted email between the first user and the second user; a download module operative to download and install the reader/responder software application program by the second user; a send module operative to send an email by the second user to the first user including a send key function module of the reader/responder software application program operative to embed an unencrypted public key; an email receiver module operative to receive the email from the second user by the first user, wherein the unencrypted public key is embedded in the email; a response module operative to respond by the first user by sending a second email to the first user, wherein the reader/responder software application program includes an encryption module operative to encrypt a message of the second email into an encrypted message using the unencrypted public key of the second user; a receipt module operative to receive the second email by the second user with the encrypted message as an attachment from the first user into a third party email software application program, wherein the third party email software application program is different from the reader/responder software application program and the email client software application program; and execution module operative to open by the second user the attachment to execute the reader/responder software application program including a reader responder module operative to allow a user without the email client software to read and respond to encrypted email created and sent from a user having the email client software.

In yet another exemplary embodiment of the present invention, a data processing system for distributing and initializing an encrypted electronic mail (email) software application for exchanging secure email, can include: means for obtaining by a first user a license for an email client software application program having public/private encryption; means for requesting by the first user that a second user download a reader/responder software application program in order to exchange encrypted email between the first user and the second user; means for downloading and installing the reader/responder software application program by the second user; means for sending an email by the second user to the first user including means for embedding an unencrypted public key by using a send key function of the reader/responder software application program; means for receiving the email from the second user by the first user, wherein the unencrypted public key is embedded in the email; means for responding by the first user by sending a second email to the first user, wherein the reader/responder software application program includes means for encrypting a message of the second email into an encrypted message using the unencrypted public key of the second user; means for receiving the second email by the second user with the encrypted message as an attachment from the first user into a third party email software application program, wherein the third party email software application program is different from the reader/responder software application program and the email client software application program; and means for opening by the second user the attachment to execute the reader/responder software application program including means for allowing a user without the email client software to read and respond to encrypted email created and sent from a user having the email client software.

In another exemplary embodiment of the present invention, a computer program product embodied on a computer readable media having program logic stored thereon, the computer program product operative to distribute and initialize an encrypted electronic mail (email) software application for exchanging secure email, the product including: program code means for enabling a computer to obtain by a first user a license for an email client software application program having public/private encryption; program code means for enabling the computer to request by the first user that a second user download a reader/responder software application program in order to exchange encrypted email between the first user and the second user; program code means for enabling the computer to download and install the reader/responder software application program by the second user; program code means for enabling the computer to send an email by the second user to the first user including program code means for enabling the computer to embed an unencrypted public key by using a send key function of the reader/responder software application program; program code means for enabling the computer to receive the email from the second user by the first user, wherein the unencrypted public key is embedded in the email; program code means for enabling the computer to respond by the first user by sending a second email to the first user, wherein the reader/responder software application program includes program code means for enabling the computer to encrypt a message of the second email into an encrypted message using the unencrypted public key of the second user; program code means for enabling the computer to receive the second email by the second user with the encrypted message as an attachment from the first user into a third party email software application program, wherein the third party email software application program is different from the reader/responder software application program and the email client software application program; and program code means for enabling the computer to open by the second user the attachment to execute the reader/responder software application program including program code means for enabling the computer to allow a user without the email client software to read and respond to encrypted email created and sent from a user having the email client software.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

FIG. 8C depicts an exemplary embodiment of a source code view of an email including an automatic embedded public key according to the present invention;

DETAILED DESCRIPTION OF THE INVENTION

Figure 1A:
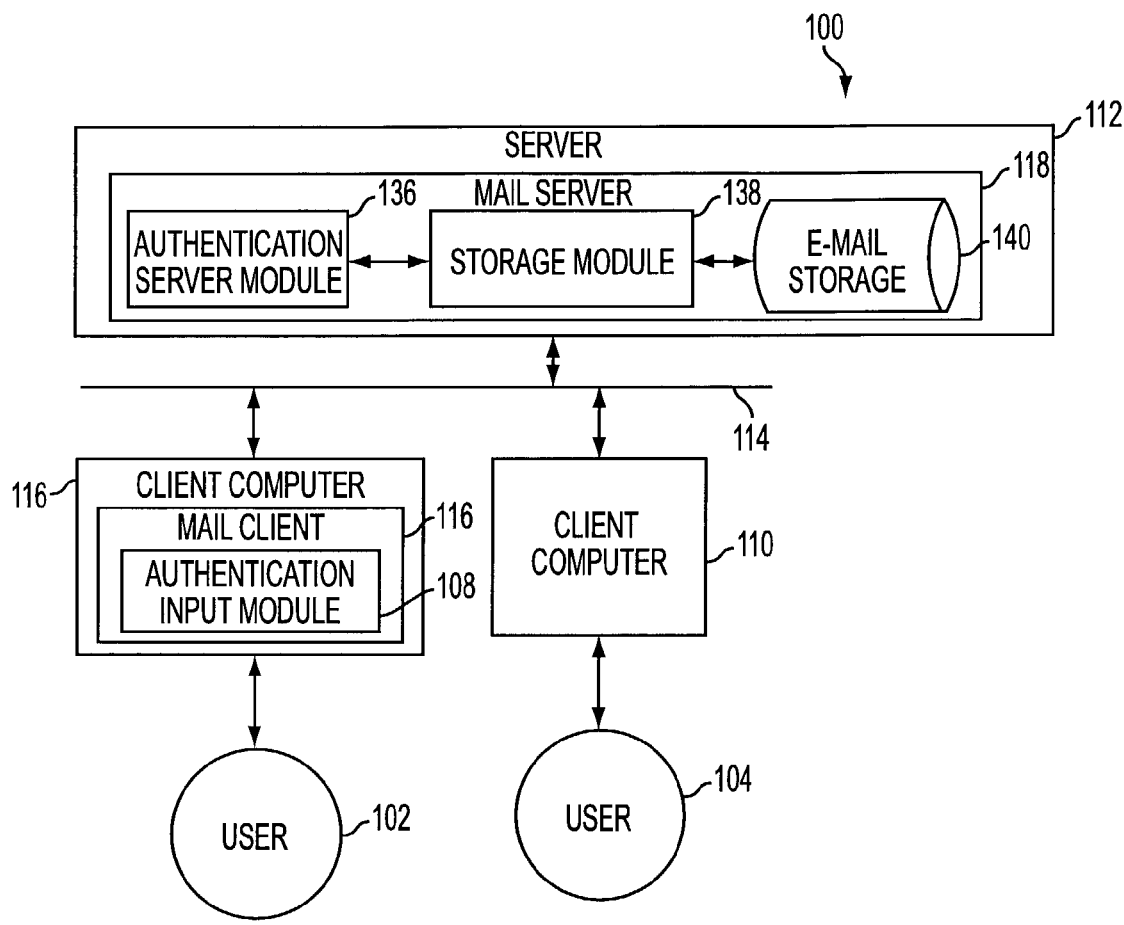
FIG. 1A is a block diagram of a distributed client/server e-mail system.

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Overview of the Invention

In many production, retail, healthcare, hospital, manufacturing or other environments, workers do not have access to a computer and e-mail, and at scheduled times go to a break room for a break. The present invention is directed to a system, method and computer program product that enables multiple users to access a single shared computer to send, receive and store e-mail messages. The system can be used continually in real-time working environment.

In one embodiment of the invention, the multiple user, shared single computer e-mail system permits these multiple users to view the computer and through a user interface identify whether new e-mail has arrived for any of the users.

In one embodiment, the users can use a touchscreen to identify themselves to the system and the system can then require entry of a password to authenticate the user. Alternatively, a conventional display monitor can be used for output of status information and a mouse or other pointing device or keyboard or other device can be used for input.

In another embodiment, the system can through its user interface identify a priority level of newly received e-mail, to prioritize which of the multiple users should gain access to the shared computer first. In one embodiment, the priority level can be identified by, e.g., providing a colored representation as to the urgency of the e-mail, such as, e.g., a colored or blinking name or button, or alphanumeric or other indication of priority such as, e.g., a ranked list.

In an embodiment of the invention, the user with the highest priority could then access the shared e-mail system first. The user with the highest priority e-mail message can then select to open his or her e-mail.

In one embodiment of the invention, a user can select to open the user's name by, e.g., using a mouse, key or highlighting a name or button with a cursor. In an embodiment, the user can then be prompted to provide authentication information such as, e.g., a password and/or company badge, to gain access to that user's personal e-mail environment.

In one embodiment of the invention, a user's personal e-mail environment can include, e.g., an inbox, an outbox, and at least one user definable file folder into which received messages can be stored. In an embodiment of the invention, the system can store messages in file folders named by sender of the message or can permit the user to provide another name for the folder such as "personal." In one embodiment of the invention, the file folders can include different security features such as, e.g., passwords for access to the specific file folder.

An encryption feature can be used to encrypt and decrypt the contents of e-mail messages to prevent unauthorized access to the contents of a message. In one embodiment, a public key can be automatically sent with an email. The public key can be included at the top of an email in one embodiment. Advantageously, to exchange public keys, two users can send emails to one another.

In one embodiment of the invention, a first group including a first subset of all users can use a first single shared computer and a second group including a second subset of all users can use a second single shared computer.

In another embodiment of the invention, a banner can be included onscreen to display advertising or other relevant information to users of the shared e-mail system. Advantageously, the banner can be used, e.g., to display advertising information which can be used, e.g., to offer the e-mail system for free or a discount to businesses.

The shared e-mail system can include other useful features such as, e.g., a dictionary for spellcheck, a thesaurus, a grammar checker, multiple standard replies, or standard reply lists (such as, e.g., an informal reply, a business or formal reply), address book for selecting recipients, special text viewing (e.g., permitting viewing HTML or text), smart names (e.g., permitting entry of letters of a name causing, e.g., lookup of one or more addressbook entries having those letters, a list of names, or the addressbook interface itself by a function key combination), user selectable function keys (e.g., permitting a user to assign particular functions to key combinations such as, e.g., Alt-k to bring up the address book), a memo feature (i.e., enabling preparing brief memos to oneself).

In another embodiment of the invention, a user can access the user's e-mail environment from the Internet's world wide web. In one embodiment, storage of the user's e-mail environment is mirrored to a server on the world wide web and is kept in synchrony. In one embodiment, a user from the web interface can send, receive, store in folders, move and delete messages. In one embodiment of the invention, the e-mail system can use a version of the standard POP3 mail application modified for the specific features of the shared e-mail system.

The present invention can also include human resource features. For example, in one embodiment of the invention, a user can clock in and clock out via the system to provide an automated timeclock.

Another human resource feature can permit tracking user statistics by capturing user data via the system including, e.g., the number of employees, the number of hourly employees, the number of female and males workers, hours worked, whether someone is in or out.

Another human resource feature of the present invention includes provision of a company wide e-mail for use in, e.g., notifying all employees of events, company policy and other announcements. The present invention, in one embodiment, can require each employee to acknowledge that they have read an e-mail (e.g., regarding a company policy) and the system can automatically compile a single record regarding all employees indicating which employees opened the e-mail and which did not. A report referred to as a read receipt report can be generated that can track which recipients have accessed a sent file. In one embodiment, the date and time of access can be tracked also. In one embodiment the report can be continually updated.

The present invention provides several other features applicable to general e-mail systems. For example, the present invention can include an e-mail system having a function that automatically removes greater-than (">") signs that other e-mail systems could have embedded into forwarded e-mails.

Another e-mail feature includes in the window interface that presents the contents of an open e-mail, a graphical display indicating a hierarchy of forwarded e-mails and attachments. Advantageously, the graphical display enables forwarding of only an included forwarded e-mail or attachment.

Another embodiment of the present invention can filter e-mail obtained from a list of internet locations (e.g., addresses or domain names), which can be maintained by an administrator (i.e., in one embodiment of the invention for a single user version, the administrator can be the user). In one embodiment of the invention, the filter can refuse acceptance of e-mails from those designated locations by maintaining a so-called "no spam" list. The filter can be used to block other e-mail based on criteria set by the administrator, such as, e.g., limiting the size of an e-mail or attachments. In one embodiment of the invention, incoming e-mail can be queued and can be forwarded to the recipient e-mail user, only at a particular time (such as, e.g., break time, lunch time, or after hours). Advantageously, this feature can prevent employees from sneaking off at non-break times to check e-mail. In another embodiment of the invention, access to a user's e-mail box can be restricted to only particular times of the day, avoiding employee temptation to check e-mail.

In another embodiment of the invention, sending of a message can be delayed to a given time by inputting a send date and time upon creation of the e-mail. Advantageously, the delayed send e-mail feature can enable earlier entry of e-mail birthday greetings to be sent on an employee's birthday.

In another embodiment of the invention, a feature can be provided to store e-mail in a folder which can default to be titled by the sender's e-mail userid (i.e., also commonly referred to as username, screenname, or e-mail address). The user can be permitted to modify the folder name such as, e.g., to replace it with the sender's company name, or department name, or other designation for the folder such as, e.g., "personal," or "confidential."

In another embodiment of the invention, the system can automatically timeout and close a user's e-mail if no action has been made for a selectable period of time, to prevent unauthorized access to the user's e-mail environment.

An Exemplary Embodiment of the Invention

FIG. 1A illustrates a block diagram of e-mail system environment 100 including an exemplary distributed client/server computer e-mail system. E-mail system environment 100 includes a sending user 102. Sending user 102 sends an e-mail message to a receiving user 104. Sending user 102 creates the e-mail on a client computer 106. Client computer 106 transmits the e-mail from sending user 102 to receiving user 104 on a client computer 110. An e-mail message may be created via mail client 116 of client computer 106 and may be sent via interaction with a mail server 118 on a server 112 over a communications network 114. An e-mail 200, described further below with reference to FIG. 2, in being sent from its source, i.e., sending user 102, can travel over communications network 114, and can pass through other computers (i.e., not shown) enroute to its final destination, client computer 110 for receipt by receiving user 104. In one embodiment of the invention, communications network 114 includes an intranet. In another embodiment, communications network 114 includes the global Internet. It would be apparent to a person having ordinary skill in the art that the features of the present invention can be used in alternative e-mail system environments and architectures.

Figure 1B:
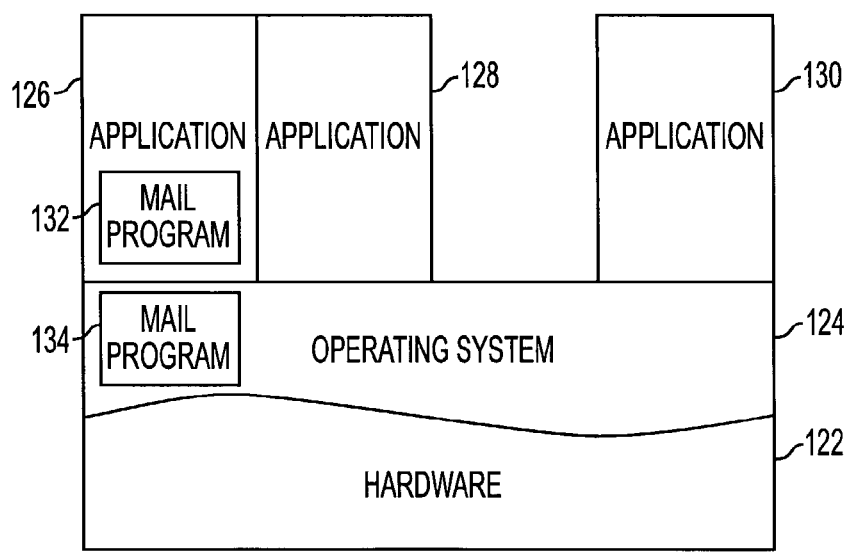
FIG. 1B is a block diagram of an exemplary system depicting an e-mail application program running on a computer hardware and operating system platform.

FIG. 1B depicts an exemplary computer environment 120 for client computer 106. It would be apparent to a person having skill in the art that environment 120 could also depict client computer 110 and server 112. Environment 120 includes hardware 122, operating system 124 and application programs 126, 128 and 130. Operating system 124 provides a uniform interface of application programming interfaces (APIs) to applications 126, 128 and 130 for access to hardware 122. An exemplary application 126 is an e-mail application program, mail program 132. Mail program 132 is an example of mail client 116 and mail server 118. Alternatively, a mail program 134 can be included as part of operating system 124 to provide e-mail functionality to applications 126, 128 and 130.

Referring back to FIG. 1A, mail client 116 can include an authentication input module which can accept a password from user 102 to validate that user 102 is authorized to access the e-mail account of user 102. Authentication input module 108 can interact with an authentication server module 136 of mail server 118 to determine whether user 102 is authorized to access the personal e-mail box of user 102.

After authenticating user 102, authentication server module 136 can provide user 102 access via a storage module 138 to the mailbox of user 102 of e-mail storage 140.

Figure 2:
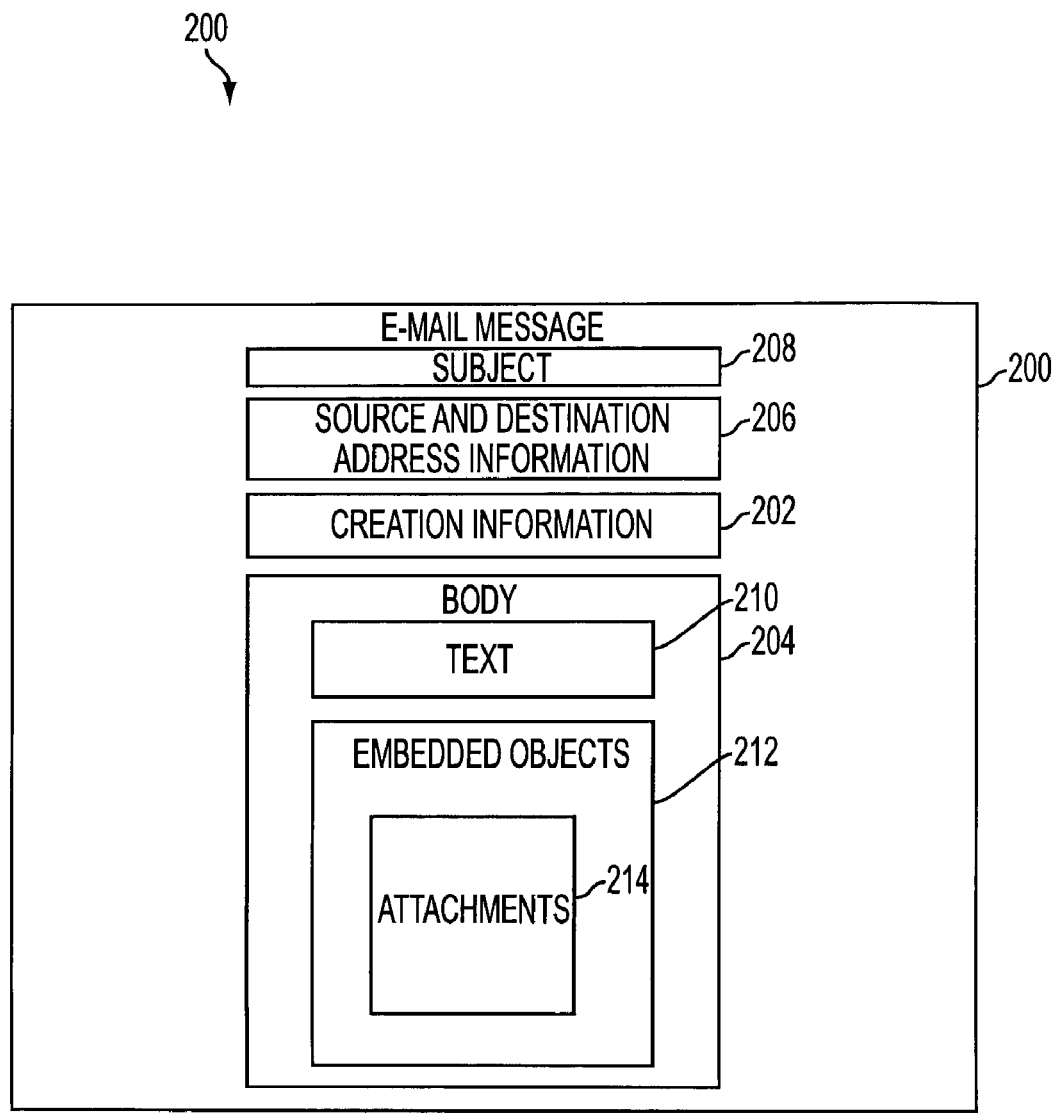
FIG. 2 depicts a conventional e-mail.

FIG. 2 illustrates an example of a conventional e-mail 200. E-mail 200 includes various data components. Example data components included in e-mail 200, are creation information 202, a body 204, address information 206, and a subject 208.

In an example embodiment, creation information 202 can include, e.g., the date and time e-mail 200 was sent from sending user 102 to receiving user 104. The body 204 of e-mail 200 can include, e.g., a text portion 210 and embedded objects 212. Embedded objects 212 can include, e.g., attachments 214. Other embedded objects 216 can include, e.g., bit map images, graphics objects, executable programs, compressed text and applets. Embedded objects 216 can also include a forwarded e-mail 200. Address information 206 can include the e-mail address of sending user 102 and receiving user 104 of e-mail 200. Attachments 214 can also include other embedded objects 212. Subject 208 can include a brief description of the contents of e-mail 200. It would be apparent to persons skilled in the art that e-mail 200 can include a subset of the listed components.

Figure 3:
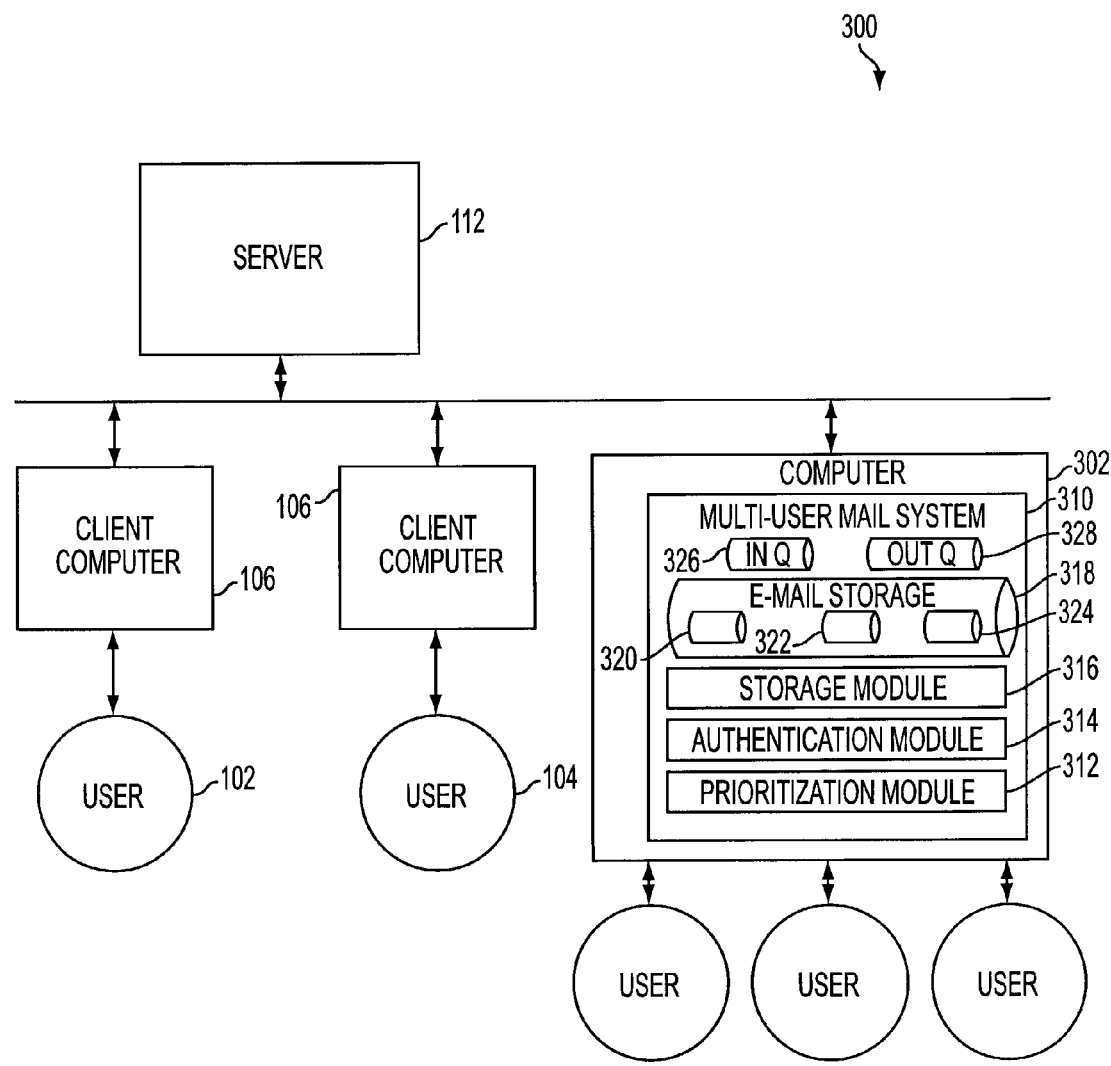
FIG. 3 is an example embodiment of a multi-user shared e-mail system according to the present invention.

FIG. 3 illustrates an example embodiment of an implementation of the present invention, including e-mail system 300. E-mail system 300 can include a computer 302 in communication with users 304, 306 and 308. Computer 302 includes a multi-user mail system 310. In a preferred embodiment, multi-user mail system 310 is a Point Clear e-mail system available from Point Clear.net, Inc. a wholly owned subsidiary of XANTE Corporation of Mobile, Ala., U.S.A. Email system 310 can include, in one embodiment, a prioritization module 312, an authentication module 314, a storage module 316, an e-mail storage module 318, an in queue 326 and an out queue 328.

Since multi-user mail system 310 runs on a single computer 302, only one of users 304, 306 and 308 can access computer 302 at one time. Access to computer 302 can be prioritized using prioritization module 312. Prioritization module 312 can indicate which of users 304, 306 and 308 should have priority to access computer 302 and multi-user mail system 310. In one embodiment, the urgency of e-mail messages can be indicated as a form of priority. For example, e-mails from a particular e-mail address could trigger a higher priority, such as, e.g., an e-mail from the CEO of a company. Other indications of priority could include, receipt of an e-mail message, versus having no new messages. Informally, a supervisor could have a higher priority than a line worker who, in turn, could have higher priority than a part-time worker.

If the highest priority user is user 304 then user 304 can proceed to authenticate using authentication module 314 by, e.g., entering a password, to access a storage environment 320. Assuming the proper authentication information is provided, then storage module 316 can provide user 304 access to storage environment 320 of e-mail storage 318 via storage module 316.

When user 304 sends an e-mail to another user, the e-mail can be routed via an out queue 328 to its final destination.

When user 304 receives an e-mail message from another user, the e-mail can be queued at in queue 326.

In one embodiment, in queue 326 and out queue 324 can be used to delay sending or receipt and for filtering operations.

The present invention enables status of multiple users' e-mail accounts to be monitored and accessed from a single computer where each user is identified on a name screen.

Figure 5:
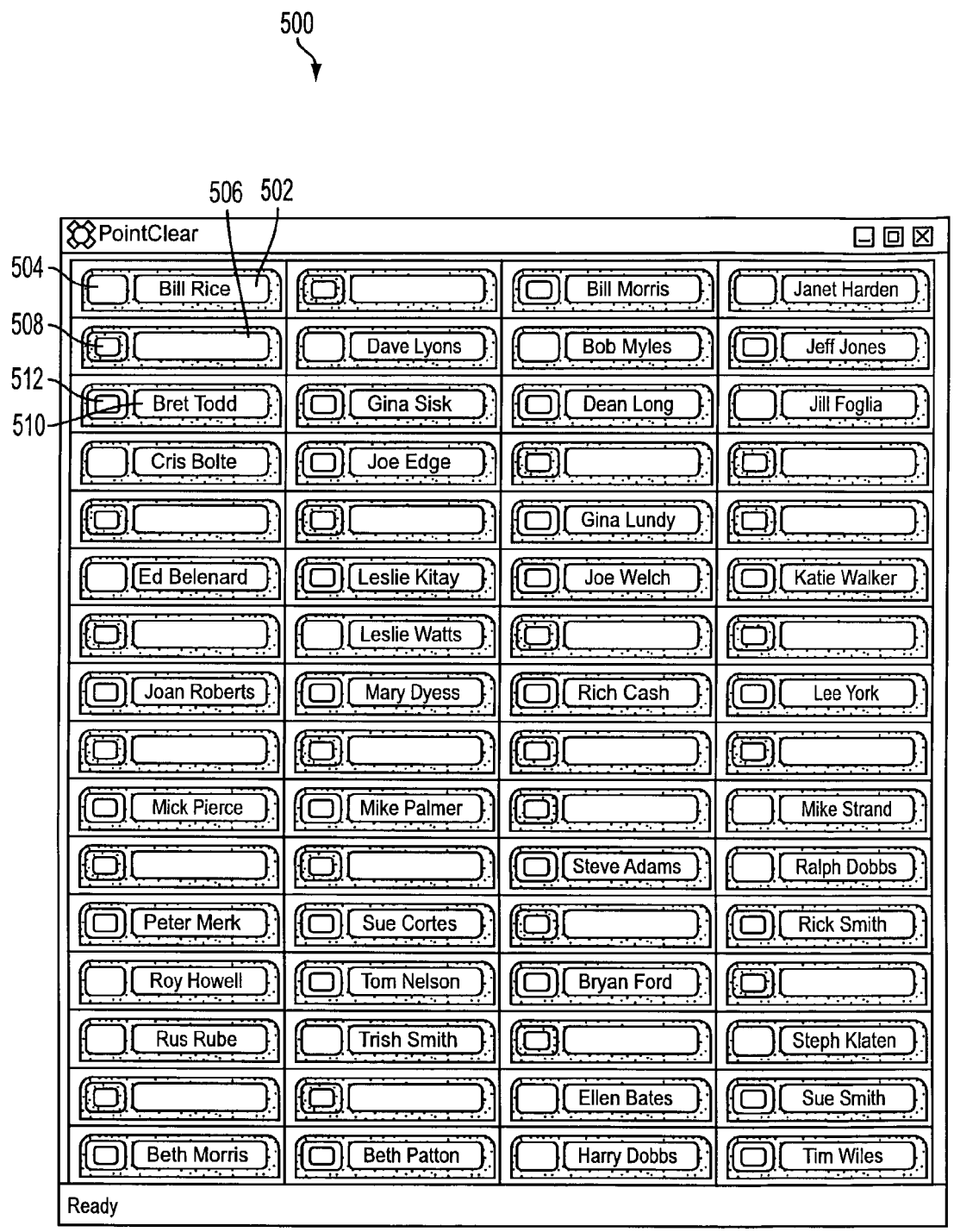
FIG. 5 depicts an exemplary embodiment of a user interface of the multi-user e-mail system of the present invention.

See FIG. 5 below depicting diagram 500 of an exemplary embodiment of a multi-user interface of the present invention. The exemplary embodiment of FIG. 5 depicts a graphical user interface (GUI) application, applet, or browser interface to the multi-user email system of the present invention. An exemplary implementation embodiment of the multi-user email system of the present invention is the PointClear™ system available from PointClear.net, Inc., a wholly owned subsidiary of XANTE Corporation of Mobile, Ala., U.S.A.

In one embodiment, the single shared computer multiple e-mail system supports greater than 7 users and up to 64 users on the single computer. In another exemplary embodiment, 4 columns of 16 users can be displayed using the multi-user interface of the multi-user email system of the present invention as shown in diagram 500.

In one embodiment, a system administration tool can be used to configure each e-mail account at a company.

In one embodiment, the name screen is the default screen for the multiple e-mail account system listing e-mail accounts by user name associated with the computer.

In one embodiment, a time clock feature is included providing an electronic time clock. For example, a system administrator can identify time clock employees, in one embodiment, and can setup specific features that need to be logged such as, e.g., log-in, log-out, overtime, human resource reporting and supervisor warnings.

In another embodiment, if an e-mail environment window is left open and is idle for a specified time then the individual's e-mail window logs out of the system. Log out can be based on, e.g., passage of a time duration or other criteria. This feature prevents unauthorized access to an account by public viewing after a user leaves the system computer without logging out.

In one embodiment, the system of the present invention can be provided for a discount such as, e.g., free, if users are willing to watch advertising. Free evaluation use could also be provided. With a free evaluation use, a date is identified after which use is disabled. After completion of particular criteria, access can be re-enabled preserving all file folders. In one embodiment, an advertising banner can be included and can be placed in a fixed location. Advertising, in one embodiment, can be provided from In another embodiment, an address book importer can be provided to import address listings from other application programs.

In one embodiment of the invention, attachments of all types can be accessible for adding to an e-mail, saving from an e-mail, deleting from an e-mail, executing from the e-mail, and forwarding as an e-mail. An e-mail can also be forwarded as an attachment. Where an e-mail has several attachments, a user can select from multiple attachments by highlighting selected attachments for forwarding and the selected attachments only can be forwarded, in one embodiment.

In one embodiment, a spam eliminator can maintain a dynamic list of e-mail addresses that can be identified as sources from which e-mail is not accepted. The spam eliminator is a filter which can be based on e-mail address, domain name, or other identifier.

In one embodiment, online help can be provided.

In another embodiment, the address book can include groups of e-mail users.

In another embodiment, e-mail folder security can be provided restricting access to stored folders to only users entering authentication criteria such as, e.g., a password associated with that folder.

In another embodiment a spell checking feature can be provided.

In another embodiment, messages can be marked as urgent, (also referred to as hot, or hot mail), or can be identified as a priority level by inclusion in their body or otherwise of identifying priority information. In one embodiment, receipt of an urgent e-mail can initiate an urgency signal such as, e.g., a visual, graphical, or audio indication. Diagram 500 of FIG. 5, for example, depicts new mail via an envelope icon 512, 508. Urgency of the emails waiting a review by the multiple users can be indicated by, e.g., color coding such as, e.g., red 506 for the highest urgency, yellow 510 for intermediate urgency and white 502 for the lowest priority. Alternatively, other colors can be used. Alternatively an audio, visual, iconic, numeric, alpha numeric, or other indication of priority can be provided. Also, a higher priority can trigger, e.g., an audio alarm, or a wireless alertor page. No new mail 504 can be indicated on the multi-user interface as well.

In another embodiment of the present invention, inclusion of specific words or phrases in an e-mail, or subject portion, for example, can be recognized by consulting a library of words and phrases, and prior to receiving the e-mail containing the words or phrases, the e-mail can be rejected. An automatic response can be initiated to the sender of the message indicating what has happened, or even warning the sender of consequences of sending such e-mail.

In another embodiment of the invention, delayed message delivery can permit identification of a delivery date and time for delivery of the e-mail message.

Figure 7:
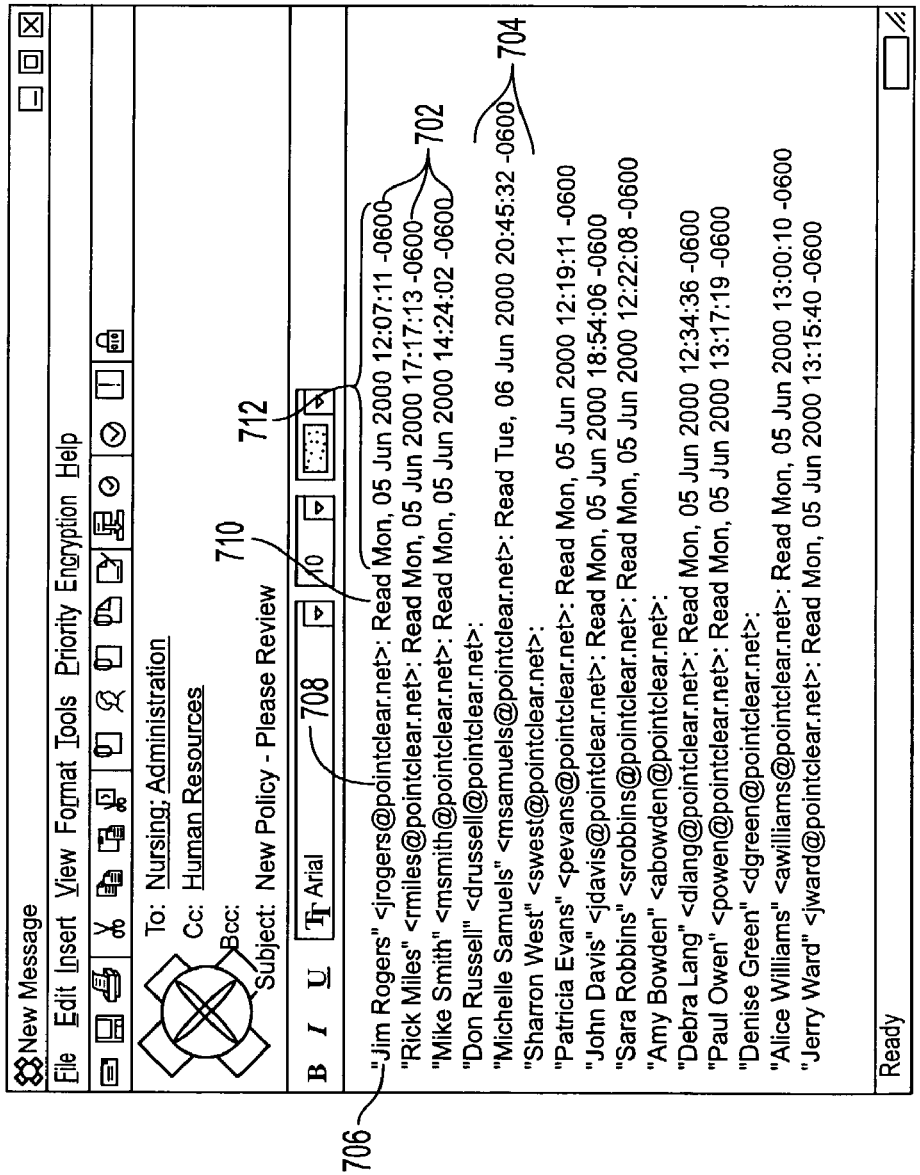
FIG. 7 depicts an exemplary embodiment of a read receipt report according to the present invention.

In another embodiment of the present invention, an e-mail account can be set up to auto forward any received e-mails to another e-mail address. In another, an autoreceipt feature can be enabled by a sender of an e-mail to verify that a receiver has, e.g., accessed, received, or opened e-mail. In an exemplary embodiment, a read receipt report can be displayed such as, e.g., the read receipt report as shown in FIG. 7 is described further below.

In another embodiment of the present invention, an encryption feature can enable entry of a personal encryption key between sender and receiver to control access to an e-mail. Multiple algorithms can be supported for encryption. Advantageously, in one embodiment, as new algorithms are developed, legacy algorithms can continue to be supported. Users of earlier revisions of the e-mail system set up with a first algorithm, can continue to use the first algorithm even when the program defaults to, e.g., a tenth algorithm. In one exemplary embodiment, a user's public key can be automatically generated by the present invention. In one embodiment, a public key can be automatically embedded in an email message that is being sent. The reader is referred to FIGS. 8A, 8B, and 8C for examples of a conventional public key infrastructure, exchange of public keys according to the present invention, and an email indicating a public key embedded at the top of the email shown when viewing the source code according to the present invention, respectively. Advantageously a user need not go through a complicated set up process as is conventionally required.

In an embodiment of the invention, when composing an e-mail and filling in the destination address field, for example, a list of names can be parsed as potential e-mail recipients based on the keys depressed by the sender of the e-mail. The more characters that are typed, in one embodiment, the narrower the selection of names. Pressing a key combination can list all possible candidates for the keys pressed, from which the user can select.

In an embodiment of the invention, a key or key combination can be defined by a user to perform tasks. Using this feature, a user can set desired actions for, e.g., function keys, and alternate and control key combinations.

In an embodiment of the invention, a user can insert a voicemail into an e-mail while composing the e-mail.

In an embodiment of the invention, a user can insert an audio/video recording into an e-mail.

In an embodiment of the invention, personal reminder memos can be created in the e-mail user environment.

In another embodiment, when an e-mail is received, the sender of the e-mail, automatically, or through prompting, can be added to the address book. In another embodiment, the carbon copy list can similarly be added to the address book.

In another embodiment of the invention, where an e-mail includes inserted greater than signs (">"), a feature can be included that deletes any greater than symbols from the beginning of a string. This character is often added by an e-mail system when forwarding an e-mail message. The ">" is a default character in many e-mail systems, but can be eliminated or changed to another character in some systems. Thus, in another embodiment, the character to be removed can be designated.

Figure 6:
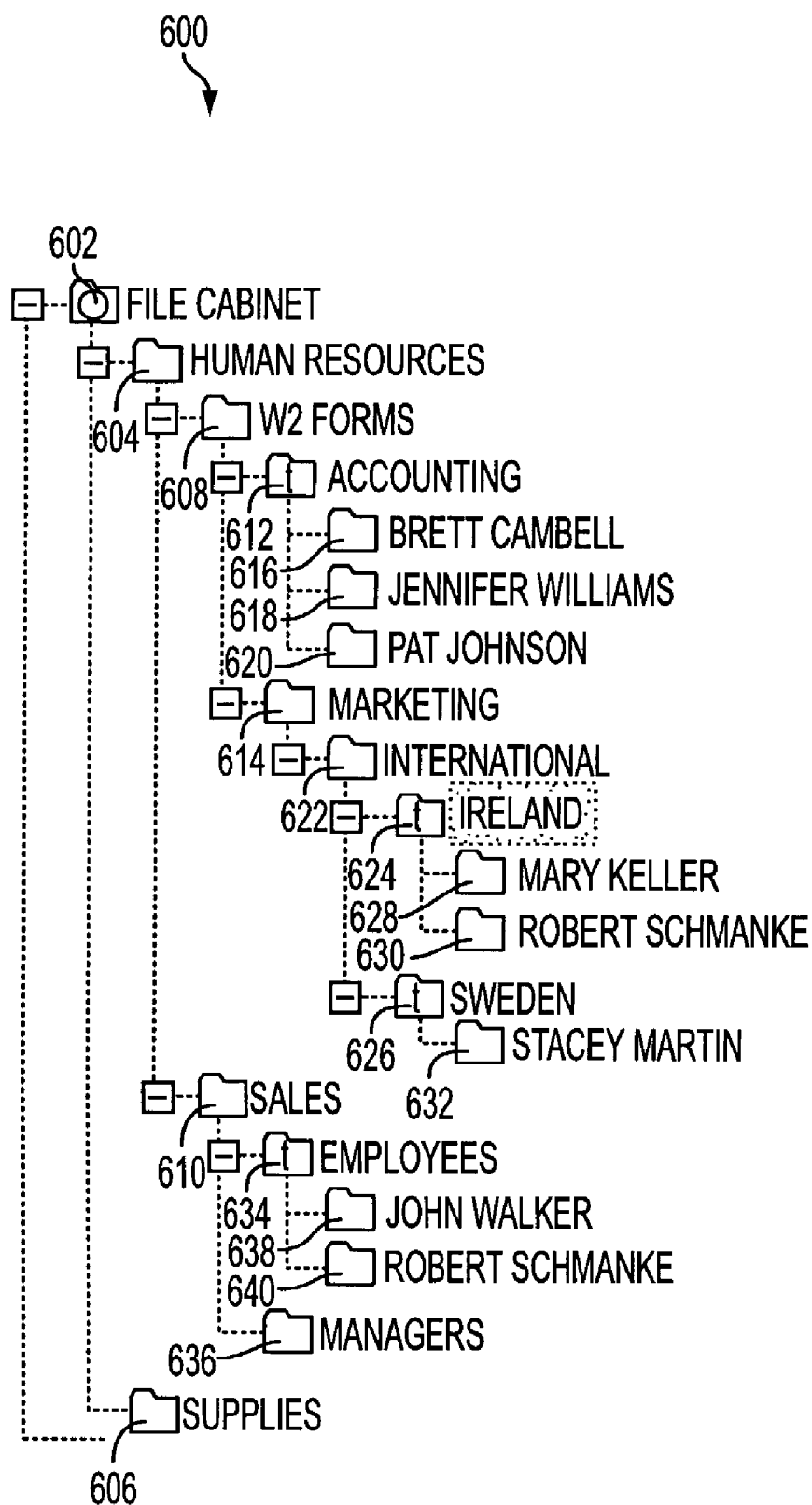
FIG. 6 depicts an exemplary embodiment of a personal file folder system of the present invention.

FIG. 6 depicts a user interface illustrating an exemplary embodiment of a personal filing system 600 of the present invention. The personal filing system 600 can include a user's e-mail environment including a file cabinet 602. The file cabinet 602 is a folder identified as a location to create personal nested sub-folders into which a user can organize incoming and outgoing e-mail. The user, in one embodiment, can set the properties for sending and receiving e-mail related to the file cabinet. For example, all e-mails sent by a sending user can be automatically stored in a personal folder in the sending user's personal file cabinet 600. In an exemplary embodiment, the email stored in a file folder named by the recipient's e-mail address or user name. In an exemplary embodiment, a read receipts continually updateable file can be stored in an assigned folder. A user can also modify the folder into which the e-mail can be stored upon sending. Similarly, for an email received from a sender at a recipient, the e-mail can be stored automatically into an assigned folder such as, e.g., a folder that can be set by the sending user's e-mail address or user name. In an exemplary embodiment, upon receiving an email, a recipient by selection of a single button can cause the email to be automatically stored in the assigned personal folder.

In an embodiment of the invention, a user's e-mail configuration can be mirrored on a server that can be accessible from a web browser, or a remote version of the mail system. This interface can give a user access to the user's address book and all the user's folders as if the user were sitting in front of the multi-user shared e-mail system computer. The user that is sending and receiving e-mail, can also be viewed, by the recipients of the e-mail, as being at the recipient's desks.

The present invention is computer platform independent. Client computer 106 in a preferred embodiment is a personal computer (PC) system running an operating system such as Windows Mac/OS, or a version of UNIX. However, the invention is not limited to these platforms. Instead, the invention can be implemented on any appropriate computer system running any appropriate operating system, such as, for example, Solaris, Irix, Linux, HPUX, OSF, Windows, Windows NT, OS/2, Mac/OS. In one embodiment, the present invention is implemented on a computer system operating as discussed herein. In another embodiment, the present invention can be implemented on hardware such as a handheld device, such as, e.g., a two-way pager, a cellular phone, a digital phone, a watch, a wireless device, a laptop, notebook or sub-notebook computer, and other computer type device such as, e.g., a micro-computer, a mini-computer and a mainframe computer.

Figure 4:
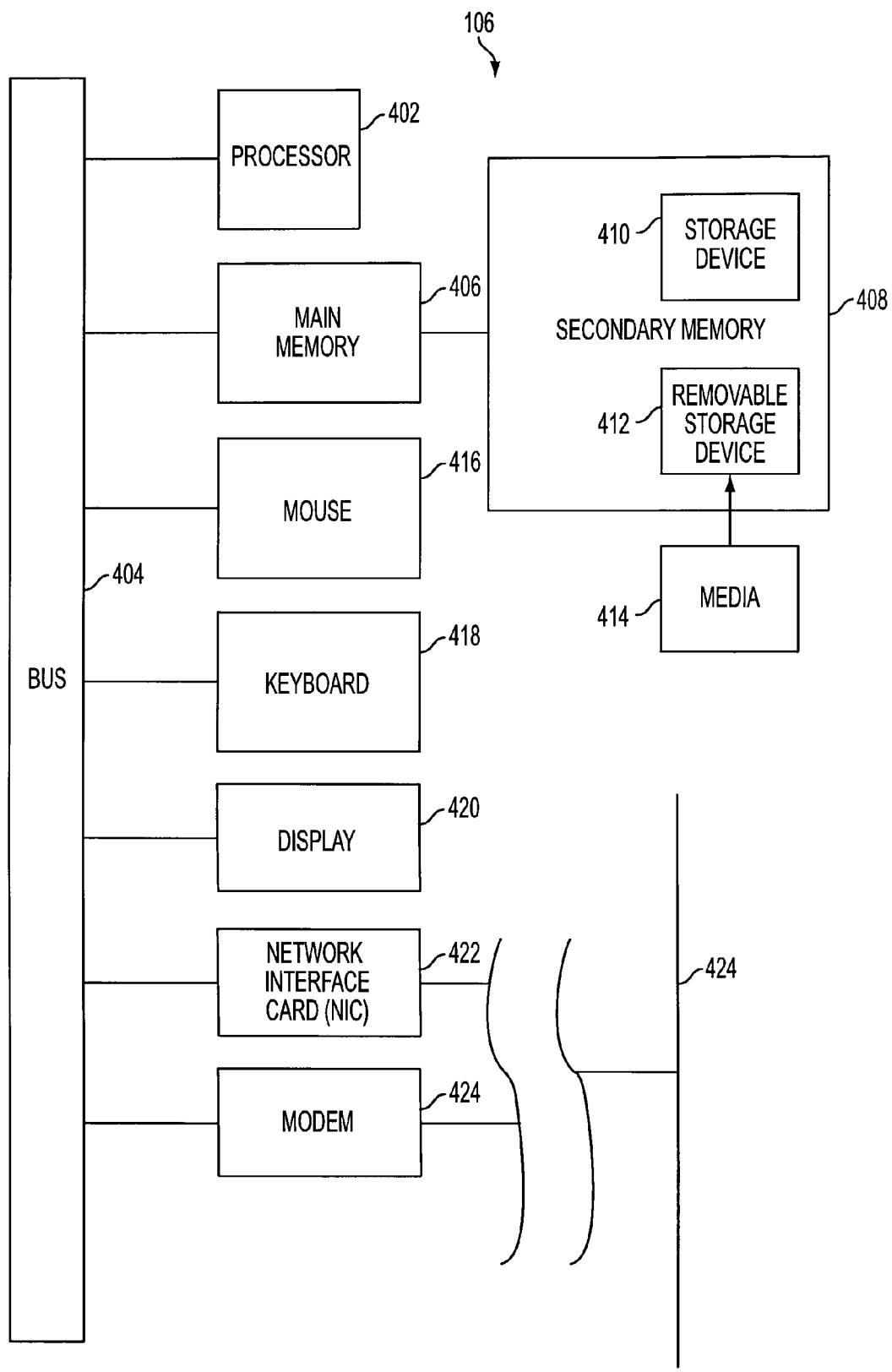
FIG. 4 depicts an exemplary computer system of the present invention.

FIG. 4 depicts an exemplary client computer 106 computer system. Other components of the invention, such as client computer 110, computer 302, and/or server computer 112, could also be implemented using a computer such as that shown in FIG. 4.

The computer system 106 can include one or more processors, such as processor 402. The processor 402 can be coupled to a communication bus 404.

Client computer 106 can also include a main memory 406, preferably random access memory (RAM), and a secondary memory 408. The secondary memory 408 can include, for example, a hard disk drive 410 and/or a removable storage device 412, representing a floppy diskette drive, a magnetic tape drive, a compact disk drive, etc. The removable storage device 412 can read from and/or write to a removable storage unit 414 in a well known manner.

Removable storage unit 414, can also be referred to as a program storage device or a computer program product, represents a floppy disk, magnetic tape, compact disk, etc. The removable storage unit 414 can include a computer usable storage medium having stored therein computer software and/or data, such as an object's methods and data.

Client computer 106 can also include an input device such as, e.g., a mouse 416 or other pointing device such as a digitizer, and a keyboard 418 or other data entry device. Client computer 106 can also include an output device such as display 418, which in one embodiment can be a touch enabled monitor. Client computer 106 can also include, e.g., a network interface card 422 and/or a modem 424 which can be used to access network 114.

Computer programs (also called computer control logic), including object oriented computer programs, can be stored in main memory 416 and/or the secondary memory 418 and/or removable storage units 414, also called computer program products. Such computer programs, when executed, enable the computer system 106 to perform the features of the present invention as discussed herein. In particular, the computer programs, when executed, enable the processor 402 to perform the features of the present invention. Accordingly, such computer programs represent controllers of the computer system 106.

In another embodiment, the invention can be directed to a computer program product comprising a computer readable medium having control logic (computer software) stored therein. The control logic, when executed by the processor 402, can cause the processor 402 to perform the functions of the invention as described herein.

In yet another embodiment, the invention can be implemented primarily in hardware using, for example, one or more state machines. Implementation of these state machines so as to perform the functions described herein will be apparent to persons skilled in the relevant arts.

FIG. 5 depicts an exemplary embodiment of multi-user graphical user interface (GUI) 500 including an indication of status of a plurality of different user email accounts. The GUI illustrated is a personal computer based software application program. The GUI could just have easily been a workstation application, a UNIX application, a JAVA applet, or an Internet or world wide web ("WWW" or web) browser based homepage, or applet GUI. In an exemplary embodiment, an indication of priority can be included. For example, a prioritization indication can be provided to indicate which email account should have priority. In one embodiment, a visual indication can be used. In another, an audio indication can be provided. In one embodiment, a color scheme can be used, as shown, including white record 502, 504, with lowest priority. An icon 508, 512, or no icon 504 can be used to indicate whether new mail has been received for one of the multi-user accounts. To provide prioritization, a yellow colored indication 510, 512 can stress a medium priority message. In the exemplary embodiment, a higher priority message 506, 508 can be stressed by coloring them red. A low priority message can be colored white. Selection of a user account by touching a touch screen, or selecting with a mouse or other input device such as, e.g., a keyboard, remote control, or cursor keys, can cause the email account environment to be opened, assuming the user can provide authentication such as, e.g., a password, a biometric, or other identification information.

FIG. 6 depicts an exemplary embodiment of a personal file system 600. Personal file system 600 can include a plurality of personal folders 602–640 for storing sent and received emails. FIG. 6 depicts a user interface illustrating an exemplary embodiment of a personal filing system 600 of the present invention. The personal filing system 600 can include a user's e-mail environment including a file cabinet 602. The file cabinet 602 is a folder identified as a location to create personal nested sub-folders into which a user can organize incoming and outgoing e-mail. The user, in one embodiment, can set the properties for sending and receiving e-mail related to the file cabinet. For example, all e-mails sent by a sending user can be automatically stored in a personal folder in the sending user's personal file cabinet 600. In an exemplary embodiment, the email stored in a file folder named by the recipient's e-mail address or user name. In an exemplary embodiment, a read receipts continually updateable file can be stored in an assigned folder. A user can also modify the folder into which the e-mail can be stored upon sending. Similarly, for an email received from a sender at a recipient, the e-mail can be stored automatically into an assigned folder such as, e.g., a folder that can be set by the sending user's e-mail address or user name. In an exemplary embodiment, upon receiving an email, a recipient by selection of a single button can cause the email to be automatically stored in the assigned personal folder.

FIG. 7 depicts an exemplary embodiment of an assigned read receipt folder's read receipt report 700. Read receipt report 700 can include names 706, and e-mail addresses 708 of recipients of the email. Upon access of the email by recipients, the read receipt report 700 can be automatically updated to include, e.g., a date and time 712 of the access, and type of access 710. The read receipt report 700, can provide various types of information in a record 702. If the email has not been accessed yet, then a blank record 704 can be provided.

Figure 8A:
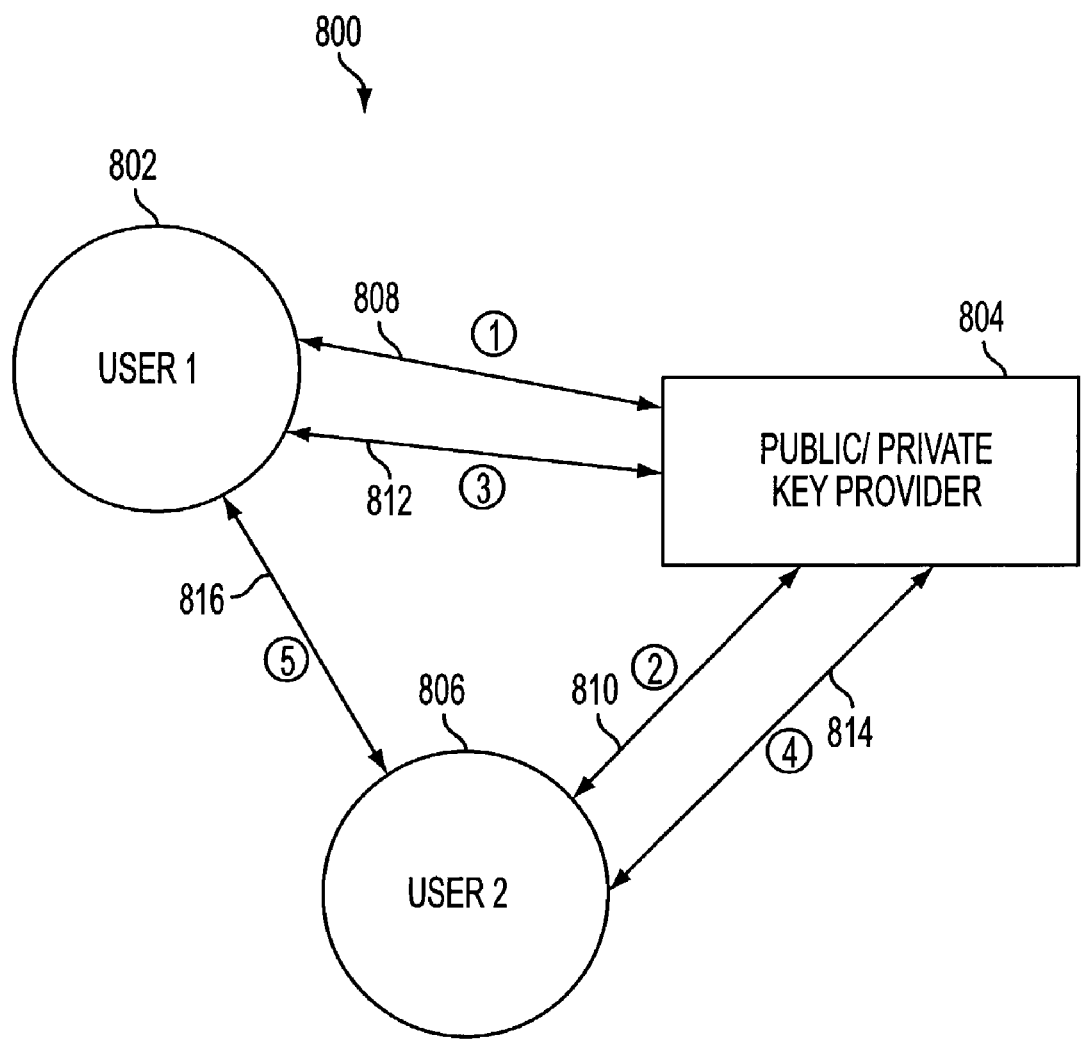
FIG. 8A depicts an exemplary setup process of a public key infrastructure (PKI) using a public and a private key.

FIG. 8A depicts a conventional public key infrastructure (PKI) 800 indicating an exemplary configuration of a user 1 802 in communication with a public/private key provider 804. Public/Private key 804 can provide information from user 2 806 to provide communication between users 802, 806.

A conventional process 800 as shown in FIG. 8A can begin with step 808.

In step 808, User 1 802 sets up an account with an encryption public/private key provider 804. From step 808, process 800 can continue with step 810.

In step 810, User 2 806 sets up an account with the encryption public/private key provider 804. Suppose User 1

802 desires to send an encrypted message to User 2 806. From step 810, process 800 continues with step 812.

In step 812, User 1 802 must learn the public key of User 2 806 by communicating with the public/private key provider 804, must search for User 2 806, and must add the key information to the email address book of User 1 802 relating to User 2 806.

Suppose User 2 806 also desires to send an encrypted message to User 1 802. Process 800 continues with step 814.

In step 814, User 2 806 also must learn the public key of User 1 802 by communicating with the public/private key provider 804, must search for User 1 802 and must add the key information to the email address book of User 2 806, relating to User 1 802. From step 814, process 800 can continue with step 816.

In step 816, User 1 802 and User 2 806 can finally send encrypted messages to each other.

An example of a conventional system implementing the system of FIG. 8A is that of Microsoft Outlook Express, available from Microsoft Corporation of Redmond, Wash., U.S.A. Such conventional systems are cumbersome to operate and require extensive user customization as already detailed, unlike the present invention. For example, the Microsoft Outlook Express Help Index describes a difficult process by which the public/private key encryption features can be setup in Outlook. The following excerpt is demonstrative of the difficulty of such conventional solutions as shown in FIG. 8A:

Sending Secure Messages

As more people send confidential information by e-mail, it is increasingly important to be sure that documents sent in e-mail are not forged, and to be certain that messages you send cannot be intercepted and read by anyone other than your intended recipient.

By using "digital IDs" with Outlook Express, you can prove your identity in electronic transactions in a way similar to showing your driver's license when you cash a check. You can also use your digital ID to encrypt messages, keeping them private. Digital IDs incorporate the S/MIME specification for secure electronic mail.

How Do Digital IDs Work?

A digital ID is composed of a "public key," a "private key," and a "digital signature." When you digitally sign your messages, you are adding your digital signature and public key to the message. The combination of a digital signature and public key is called a "certificate."

Recipients can use your digital signature to verify your identity and use your public key to send you encrypted mail that only you can read by using your private key. In order to send encrypted messages, your address book must contain digital IDs for the recipients. That way, you can their public keys to encrypt the messages. When a recipient gets an encrypted message, their private key is used to decrypt the message for reading.

Before you can start sending digitally signed messages, you must obtain a digital ID and set up your mail account to use it. If you are sending encrypted messages, your address book must contain a digital ID for each recipient.

Where Do You Get Digital IDs?

Digital IDs are issued by independent certification authorities. When you apply for a digital ID at a certification authority's Web site, they verify your identity before issuing an ID. There are different classes of digital IDs, each certifying to a different level of trustworthiness. For more information, use the Help at the certification authority's Web site.

In order to obtain someone else's digital ID, you can request they send you digitally signed mail, or you can search the digital ID database on a certification authority's Web site. You can also search Internet directory services that list digital IDs along with other properties.

How Do You Verify a Digital Signature?

With "revocation checking," you can verify the validity of a digitally signed message. When you make such a check, Outlook Express requests information on the digital ID from the appropriate certification authority. The certification authority sends back information on the status of the digital ID, including whether the ID has been revoked. Certification authorities keep track of certificates that have been revoked due to loss or termination.

Figure 8B:
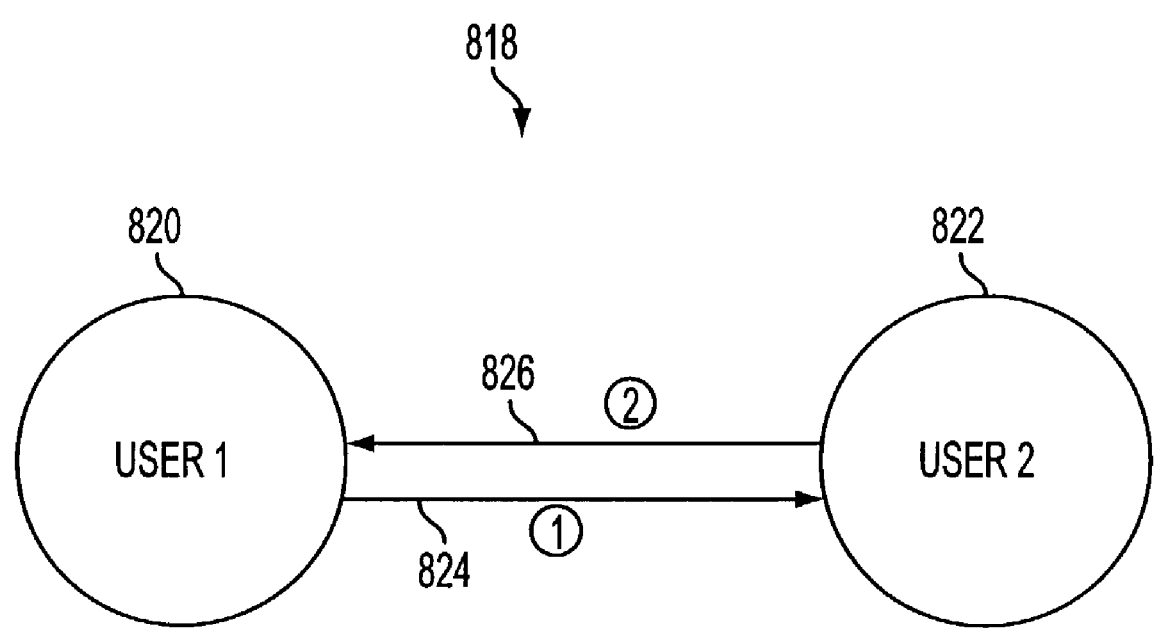
FIG. 8B depicts a exemplary embodiment of an improved setup process for configuring public and private keys according to the present invention.

FIG. 8B depicts an exemplary embodiment of an improved configuration method that configures a secure public/private key configuration method 818. User 1 802 can send in step 824 a message to user 2 822. In step 826, user 2 822 can send an email to user 1 820. Since, according to the present invention, a user 820, 822 can automatically have a public key be embedded in the email, the exchange shown can automatically provide public keys to the recipients of the messages.

Using the present invention, two users interested in exchanging public keys can perform the following steps:

1. Both sender and receiver can be using PointClear on their respective systems or computer(s);
2. User 1 802 can send a message to User 2 822; and
3. User 2 822 can send a message to User 1 802.

In an exemplary implementation embodiment, the above listed steps can be performed using the PointClear e-mail program of PointClear.net, Inc., a wholly-owned subsidiary of XANTE Corporation of Mobile, Ala., U.S.A.

FIG. 8C shows an exemplary embodiment of a view 828 of an email which can illustrate a public key that has been embedded for ease of providing the public key of one user to another user, for use in communicating via, e.g., an encrypted communication, according to the present invention. The view 828 is shown in a view revealing the source code of the email.

Overview of Reader-Responder

Referring briefly to FIG. 3, in an exemplary embodiment of the present invention, a user 304–308 of a first email system may wish to exchange e-mail with a user 102 of a second email system, where user 102 is not on the first email system of user 304–308. If the first email system provides certain proprietary features, such as, e.g., encryption, receipt notification, etc., then conventionally the recipient user 102 on the second email system may not be able to access the email created by the sending user 304–308 of the first email system. Also, conventionally, users 102 and users 304–308 may not be able to take advantage of the proprietary features of the first email system when user 102 is not running on the first email system.

In an exemplary embodiment of the present invention, a reader-responder module can be used by the user 102 of the second email system, in order to allow the user 102 to read and respond to an email sent from user 304–308 of the first email system, taking advantage of the proprietary features of the first email system.

In an exemplary implementation embodiment, the reader-responder module can be a POINTCLEAR reader-responder available from Pointclear.net, Inc., a wholly owned subsidiary of the XANTE CORPORATION of Mobile, Ala., U.S.A.

In an exemplary embodiment, the user 304–308 can send a copy of the reader-responder module to the user 102. In one exemplary embodiment, the user 304–308 can sent the key of the user 304–308 along with the reader-responder module to the user 102. The user 102 can then install the reader-responder module on the workstation of user 102. The user 102 can send the key of user 102 as illustrated in FIG. 9 to the user 304–308 to enable the user 304–308 to send an email taking advantage of the proprietary functions.

Alternatively, the user 102 can download the reader-responder module, e.g., from a network or other computer system. Subsequently, the user 304–308 can send the key of user 304–308 to the user 102. User 102 can then send the key of the user 102 to user 304–308 as illustrated in FIG. 9, below.

Figure 9:
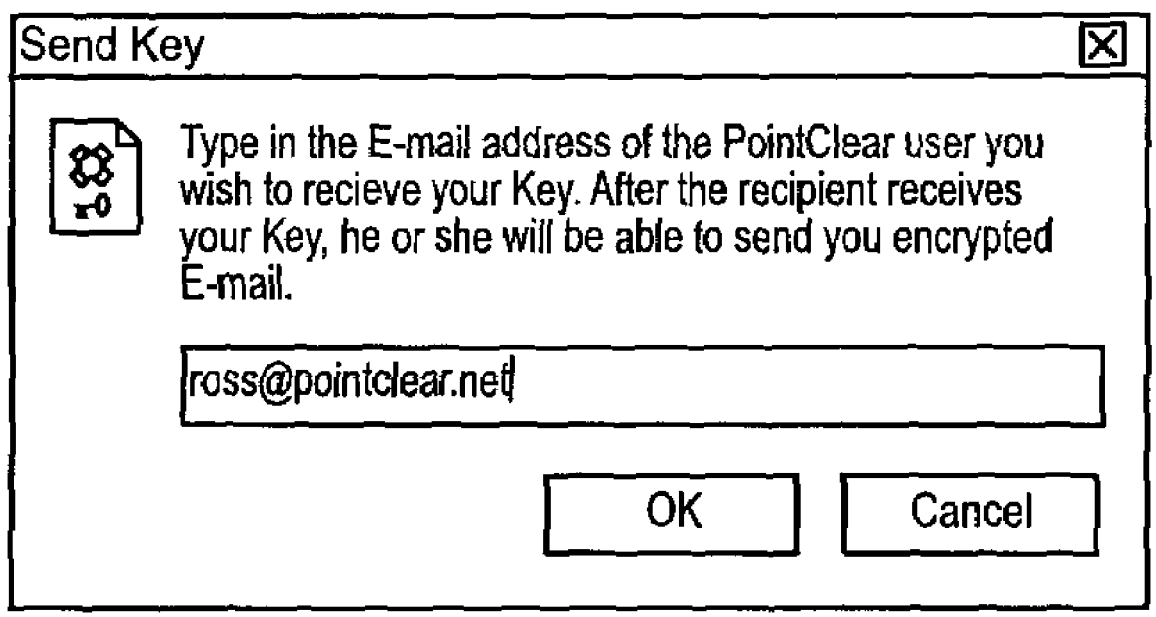
FIG. 9 depicts an exemplary embodiment of a graphical user interface illustrating a reader-responder module of the present invention being used to send the key from one user to another in order to enable sending encrypted e-mail.

FIG. 9 depicts an exemplary embodiment of a graphical user interface 900 illustrating set-up of a reader-responder module of the present invention. Specifically, the reader-responder module can be used to send a key from user 102 to the user 304–308 in order to enable the user 304–308 to send an e-mail taking advantage of proprietary features of a first e-mail system (i.e., the email system of user 304–308), to the user 102 who is not on the first email system.

The reader is again referred to FIG. 8C which can now be used to illustrate an exemplary embodiment of a view 828 of an email in which a public key has been embedded for ease of providing the public key of the user 102 to the user 304–306 of the first email system, for use in communicating via, e.g., an encrypted communication, according to the present invention. The view 828 as illustrated, is shown in a view revealing the source code of the email. It will be apparent to those skilled in the art that alternative views of the e-mail can be provided, and can also be provided as a default view.

Figure 11:
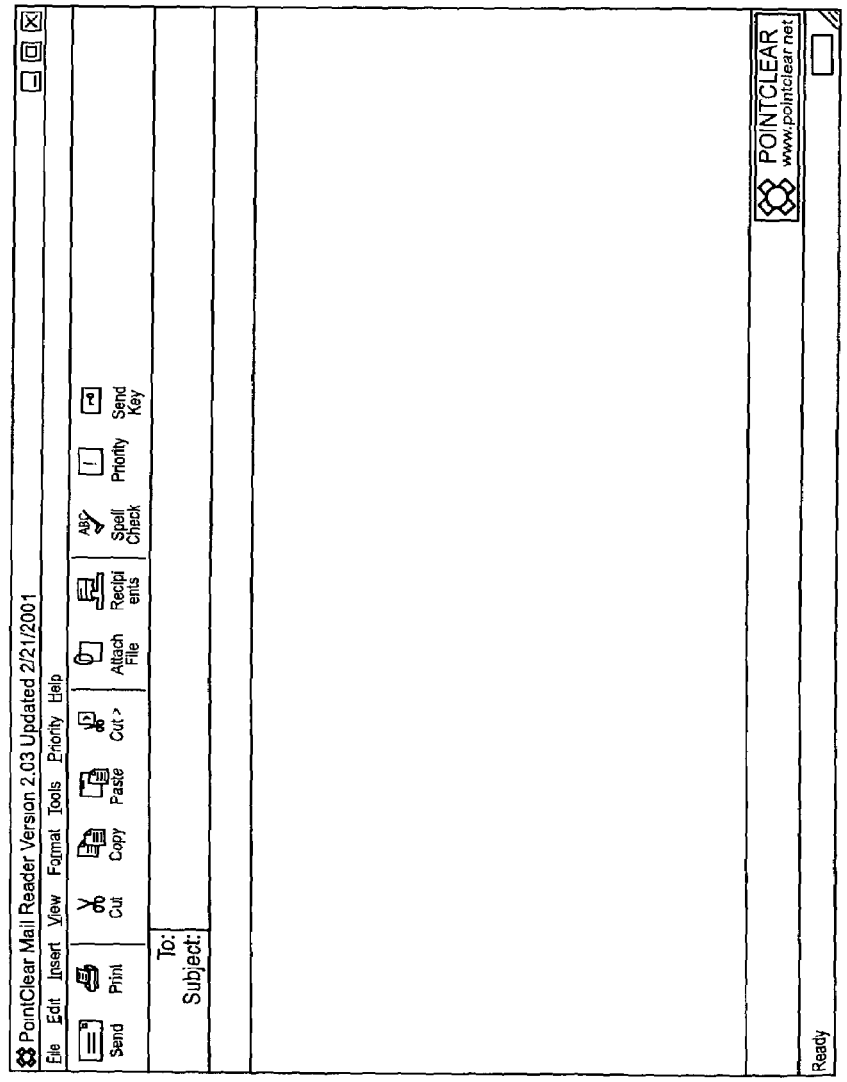
FIG. 11 depicts an exemplary embodiment of a graphical user interface illustrating an email creation window of an exemplary embodiment of the reader-responder module of the present invention.

Once the reader-responder module is set up, then the user 102 can receive e-mail from users 304–308 of the first email system that take advantage of proprietary features of the first email system. If user 102 wishes to respond to user 304–308 then the user 102 can use the reader-responder module to create an e-mail as shown in FIG. 11.

Figure 10:
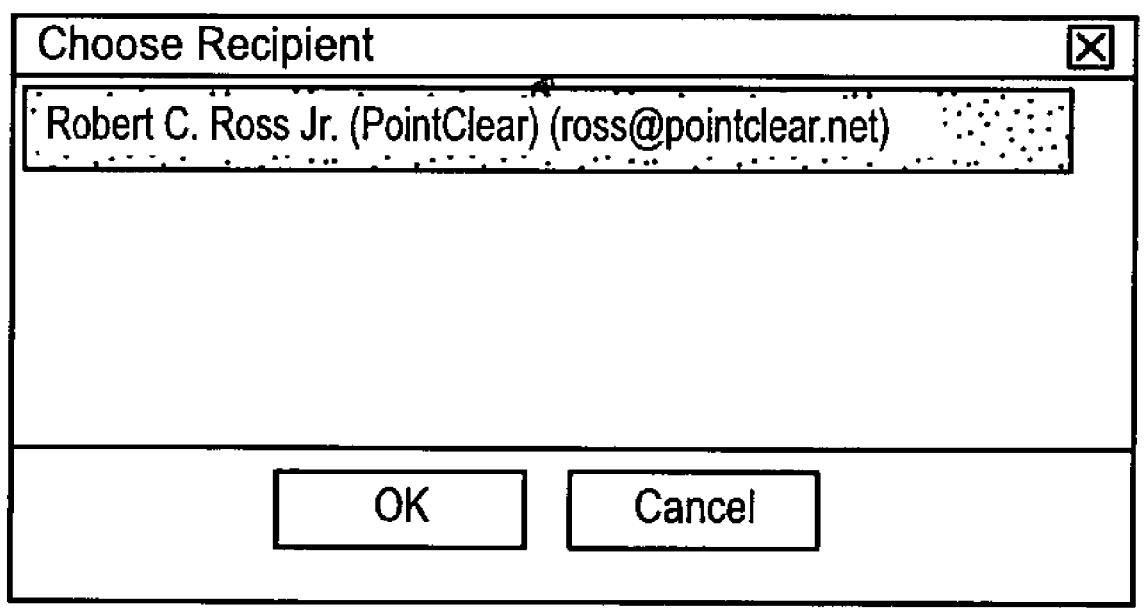
FIG. 10 depicts an exemplary embodiment of a graphical user interface illustrating an address book of a reader-responder module populated with users to which an e-mail can be sent for the user of the reader-responder module.

In an exemplary embodiment, if the user 102 desires to send a carbon-copy to other users 304–308, then the user 102 can look them up in an address book as illustrated in FIG. 10, as described further below with reference to FIG. 10. If the other users 304–308 are not listed in the address book, the users 304–308 can be added to the address book. In an exemplary embodiment, the user 102 can have the users 304–308 send the user 102 an email providing user 102 the keys of other users 304–308, to support encryption.

In an exemplary embodiment, if user 102 desires to send an email to a user 104 who is not on the first email system of users 304–308, then the user 102 will not be permitted to do so without first obtaining a license to the full featured version of the first email system. Once user 102 becomes a licensed user of the first e-mail system, then the user 102 can be permitted to send a copy of the reader-responder module to other users 104 which are not licensed users of the first email system. Advantageously, the ability to send a copy of a reader-responder module to non-licensed users can be an effective viral marketing approach to create interest in and to encourage licensure of the full-featured version of the first email system.

FIG. 10 depicts an exemplary embodiment of a graphical user interface 1000 illustrating an address book of an exemplary reader-responder module of the present invention. Specifically, the address book can be populated with users 304–308 to which an e-mail can be sent for the user 102 of the reader-responder module, which is not on the first email system of users 304–308.

The user 102 although licensed to use the reader-responder module, is not a licensed user of the first email system of users 304–308. Initially (assuming the user 102 has already received and installed a copy of the reader-responder module on the workstation of user 102, and has received the key of user 304–308), the only recipients listed in the address book of user 102, to which user 102 can send an email using the reader-responder software, is the user 304–306 who has sent user 102 the key of user 304–308. If other users 304–308 send the keys of the other users 304–308 to the user 102, then the names of the other users 304–308 can also appear on the recipients list of the address book of user 102.

It is important to note, however, that in the exemplary embodiment, the user 102 can not send emails using the reader-responder module to users 104 which are not users of the first email system of user 304–308. Thus, the user 102 will not be able to add users 104 to the address book of user 102 if the users 104 are not licensed users of the first e-mail system of user 304–308.

If the user 102 becomes a licensed user of the first e-mail system of user 304–308, e.g., by paying a transaction fee, then the user 102 has in fact become a user 304–308 and will then be able to send email to any other user 304–308 and can also send copies of the reader-responder module to other users 104 which are not users of the first email system of user 304–308.

FIG. 11 depicts an exemplary embodiment of a graphical user interface illustrating an email creation window of an exemplary embodiment of the reader-responder module of the present invention. As shown, the email creation window of the exemplary embodiment can include various icons such as, e.g., a send icon that can be used to send the email; a print icon that can be used to print the email; cut/copy/paste icons that can be used as conventionally known to cut, copy or paste data from or into the email; a cut ">" icon that can be used to eliminate embedded indentation characters; an attach file icon that can be used to add an attachment to the email; a recipients icon that can be used to open the reader address book as described above with reference to FIG. 10; a spell check icon that can be used to spell check the e-mail message contents; a priority icon that can be used to identify the priority of the email; and a send key icon that can be used to embed a sending user's key to the email for sending along to the receiving user. Other conventional fields such as addressee, subject and body fields can be provided as well as other functions in pull-down menus and other useful functionality as will be apparent to those skilled in the relevant art.

Figure 12:
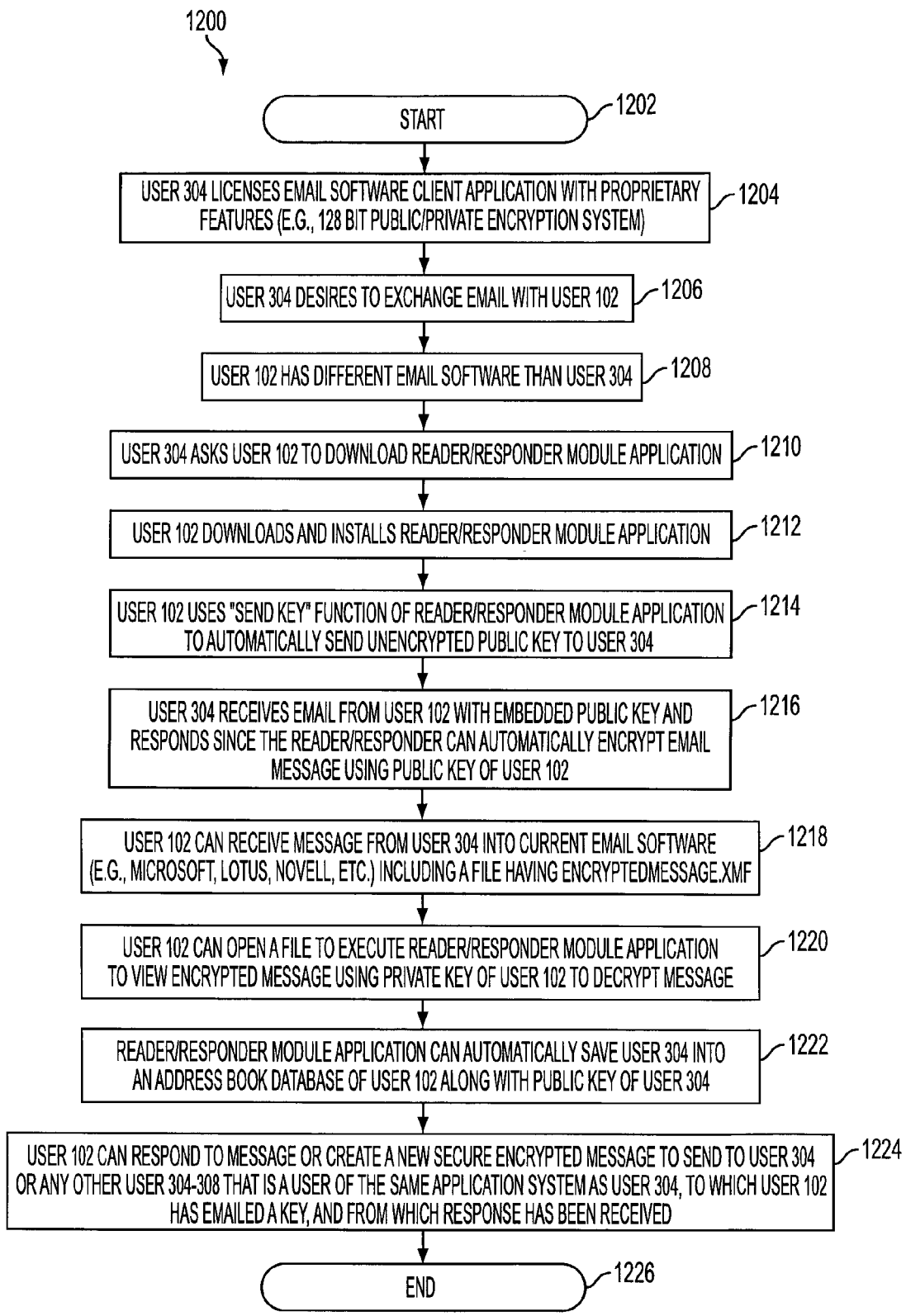
FIG. 12 depicts an exemplary embodiment of a flow diagram illustrating how users could use a reader-responder module according to the present invention to exchange e-mail.

FIG. 12 depicts an exemplary embodiment of a flow diagram 1200 illustrating how users could use a reader-responder module according to the present invention to exchange e-mail.

Flow diagram 1200 of FIG. 12 can begin with step 1202 and can continue immediately with step 1204.

In step 1204, in an exemplary embodiment, user 304 can license an e-mail client application having proprietary features. In an exemplary embodiment, the e-mail client application can include a proprietary encryption feature. However it is important to note that alternative proprietary features could be provided according to the technique of the present invention. In an exemplary implementation embodiment the e-mail client application can be PointClear Client Software, available from PointClear Communications, at PointClear.net of Mobile, Ala., U.S.A. including a 128 bit Public/Private Key Encryption System. From step 1204, flow diagram 1200 can continue with step 1206.

In step 1206, in an exemplary embodiment, user 304 can desire to exchange email with user 102, who is on a different email system. Specifically, in an exemplary embodiment, user 304 can desire to exchange encrypted e-mail with the user 102. From step 1206, flow diagram 1200 can continue with step 1208.

In step 1208, in an exemplary embodiment, user 102 can have a different e-mail software system than user 304. For example, if user 304 uses an e-mail software application system available from PointClear.net, and user 102 instead uses an e-mail software application system available from, e.g., Microsoft, Novell, Lotus, or any other software developer, then only a subset of features of the PointClear.net e-mail software application system might be available to the users. For example, perhaps only text-based email would be supported, because of lack of support for certain proprietary features. From step 1208, flow diagram 1200 can continue with step 1210.

In step 1210, in an exemplary embodiment, user 304 can request that user 102 download reader/responder module application software. For example, the software can be PointClear Reader/Responder Module application software from www.pointclear.net/reader. In an exemplary embodiment, the software download can be free of charge. Product features of the PointClear Reader/Responder Module application software can provide a subset of a full-featured licensed version of a PointClear Client Application Software. From step 1210, flow diagram 1200 can continue with step 1212.

In step 1212, in an exemplary embodiment, user 102 can download and install reader/responder module application e-mail software or system. From step 1212, flow diagram 1200 can continue with step 1214.

In step 1214, in an exemplary embodiment, user 102 can use a "send key" program that can be included, e.g., as a function of the reader/responder module application. In an exemplary embodiment, the send key function can be used to automatically send an unencrypted public key to user 304. From step 1214, flow diagram 1200 can continue with step 1216.

In step 1216, in an exemplary embodiment, user 304 can receive an email from user 102 with an embedded public key and can respond as the reader/responder can automatically encrypt the e-mail message using the public key of user 102. From step 1216, flow diagram 1200 can continue with step 1218.

In step 1218, in an exemplary embodiment, user 102 can receive a message from user 304 into the email software of user 102 (i.e., Microsoft, Lotus, Novell, etc.). In an exemplary embodiment, the email can include a file named encryptedmessage.xmf. From step 1218, flow diagram 1200 can continue with step 1220.

In step 1220, in an exemplary embodiment, user 102 can open the file that can automatically execute the reader/responder module application. The reader/responder module application according to an exemplary embodiment of the present invention can view an encrypted message using a private key of User 102 to decrypt the email message. From step 1220, flow diagram 1200 can continue with step 1222.

In step 1222, in an exemplary embodiment, the reader/responder module application can automatically save user 304 into an address book database along with a public key of user 304. From step 1222, flow diagram 1200 can continue with step 1224.

In step 1224, in an exemplary embodiment, user 102 can then respond to the message. In an exemplary embodiment, user 102 can alternatively create a new secure encrypted e-mail message that can be sent to user 304 or any other licensed user of the email software client application to which user 102 has already sent a key, and from which user 102 has already received a response. From step 1224, flow diagram 1200 can continue immediately with step 1226, where flow diagram 1200 can end.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of distributing and initializing an electronic mail (email) software application for exchanging secure encrypted email, comprising the steps of:

obtaining by a first user a license for an email client software application program supporting public/private encryption of emails;

requesting by the first user that a second user download a reader/responder software application program in order to exchange encrypted email between the first user and the second user;

downloading and installing said reader/responder software application program by the second user;

sending a first email by the second user to the first user including embedding an unencrypted public key by using a send key function of said reader/responder software application program;

receiving said first email from the second user by the first user, wherein said unencrypted public key is embedded in said first email;

responding by the first user by sending a second email to the second user, where said reader/responder software application program encrypts a message of said second email into an encrypted message using said unencrypted public key of the second user;

receiving said second email by the second user with said encrypted message as an attachment from the first user into a third party email software application program, wherein said third party email software application program is different from said reader/responder software application program and said email client software application program;

opening by the second user said attachment to execute said reader/responder software application program operative to allow the second user without said email client software to read and respond to encrypted email created and sent from at least one of the first user or another user having said email client software; and creating a new secure email including an encrypted message by the second user to send to at least one of the first user or any other user of said email client software application program to which the second user has emailed a public key and from which the second user has received a response email, wherein the second user is not able to create a new secure email message to send to a user that is not a user of said email client software application program.

2. The method according to claim 1, further comprising:
viewing by the second user said encrypted message using said reader/responder software application program including decoding said encrypted message using a private key for the second user.

3. The method according to claim 1, further comprising:
saving information about the first user into an address book database belonging to the second user along with an unencrypted public key for the first user.

4. The method according to claim 1, wherein said email client software application program uses at least 128-bit public/private encryption.

5. A data processing system operative to distribute and initialize an encrypted electronic mail (email) software application for exchanging secure email, comprising:
a license module operative to obtain by a first user a license for an email client software application program supporting public/private encryption of emails;
a request module operative to request by the first user that a second user download a reader/responder software application program in order to exchange encrypted email between the first user and the second user;
a download module operative to download and install said reader/responder software application program by the second user;
a send module operative to send a first email by the second user to the first user including a send key function module of said reader/responder software application program operative to embed an unencrypted public key;
an email receiver module operative to receive said first email from the second user by the first user, wherein said unencrypted public key is embedded in said first email;
a response module operative to respond by the first user by sending a second email to the second user, wherein said reader/responder software application program includes an encryption module operative to encrypt a message of said second email into an encrypted message using said unencrypted public key of the second user;
a receipt module operative to receive said second email by the second user with said encrypted message as an attachment from the first user into a third party email software application program, wherein said third party email software application program is different from said reader/responder software application program and said email client software application program;
an execution module operative to open by the second user said attachment to execute said reader/responder software application program including a reader responder module operative to allow the second user without said email client software to read and respond to encrypted email created and sent from at least one of the first user or another user having said email client software; and
a secure email creation module operative to create a new secure email including an encrypted message by the second user to send to at least one of the first user or any other user of said email client software application program to which the second user has emailed a public key and from which the second user has received a response email, wherein the second user is not able to create a new secure email message to send to a user that is not a user of said email client software application program.

6. A data processing system for distributing and initializing an encrypted electronic mail (email) software application for exchanging secure email, comprising:
means for obtaining by a first user a license for an email client software application program supporting public/private encryption of emails;
means for requesting by the first user that a second user download a reader/responder software application program in order to exchange encrypted email between the first user and the second user;
means for downloading and installing said reader/responder software application program by the second user;
means for sending a first email by the second user to the first user including means for embedding an unencrypted public key by using a send key function of said reader/responder software application program;
means for receiving said first email from the second user by the first user, wherein said unencrypted public key is embedded in said first email;
means for responding by the first user by sending a second email to the second user, wherein said reader/responder software application program includes means for encrypting a message of said second email into an encrypted message using said unencrypted public key of the second user;
means for receiving said second email by the second user with said encrypted message as an attachment from the first user into a third party email software application program, wherein said third party email software application program is different from said reader/responder software application program and said email client software application program;
means for opening by the second user said attachment to execute said reader/responder software application program including means for allowing the second user without said email client software to read and respond to encrypted email created and sent from at least one of the first user or another user having said email client software; and
means for creating a new secure email including an encrypted message by the second user to send to at least one of the first user or any other user of said email client software application program to which the second user has emailed a public key and from which the second user has received a response email, wherein the second user is not able to create a new secure email message to send to a user that is not a user of said email client software application program.

7. The system according to claim 6, further comprising:
means for viewing by the second user said encrypted message using said reader/responder software application program including decoding said encrypted message using a private key for the second user.

8. The system according to claim 6, further comprising:
means for saving information about the first user into an address book database belonging to the second user along with an unencrypted public key for the first user.

9. The system according to claim 6, wherein said email client software application program uses at least 128-bit public/private encryption.

10. A computer program product embodied on a computer readable media having program logic stored thereon, said computer program product operative to distribute and initialize an encrypted electronic mail (email) software application for exchanging secure email, comprising:

program code means for enabling a computer to obtain by a first user a license for an email client software application program supporting public/private encryption of emails;

program code means for enabling the computer to request by the first user that a second user download a reader/responder software application program in order to exchange encrypted email between the first user and the second user;

program code means for enabling the computer to download and install said reader/responder software application program by the second user;

program code means for enabling the computer to send a first email by the second user to the first user including program code means for enabling the computer to embed an unencrypted public key by using a send key function of said reader/responder software application program;

program code means for enabling the computer to receive said first email from the second user by the first user, wherein said unencrypted public key is embedded in said email;

program code means for enabling the computer to respond by the first user by sending a second email to the second user, wherein said reader/responder software application program includes program code means for enabling the computer to encrypt a message of said second email into an encrypted message using said unencrypted public key of the second user;

program code means for enabling the computer to receive said second email by the second user with said encrypted message as an attachment from the first user into a third party email software application program, wherein said third party email software application program is different from said reader/responder software application program and said email client software application program;

program code means for enabling the computer to open by the second user said attachment to execute said reader/responder software application program including program code means for enabling the computer to allow the second user without said email client software to read and respond to encrypted email created and sent from at least one of the first user or another user having said email client software; and program code means for creating a new secure email including an encrypted message by the second user to send to at least one of the first user or any other user of said email client software application program to which the second user has emailed a public key and from which the second user has received a response email, wherein the second user is not able to create a new secure email message to send to a user that is not a user of said email client software application program.

11. The computer program product according to claim 8, further comprising:

program code means for viewing by the second user said encrypted message using said reader/responder software application program including decoding said encrypted message using a private key for the second user.

12. The computer program product according to claim 10, further comprising:

program code means for saving information about the first user into an address book database belonging to the second user along with an unencrypted public key for the first user.

13. The computer program product according to claim 10, wherein said email client software application program uses at least 128-bit public/private encryption.

14. The system according to claim 5, further comprising:

a view module operative to allow the second user to view said encrypted message using said reader/responder software application program including decoding said encrypted message using a private key for the second user.

15. The system according to claim 5, further comprising:

a save module operative to save information about the first user into an address book database belonging to the second user along with an unencrypted public key for the first user.

16. The system according to claim 5, wherein said email client software application program uses at least 128-bit public/private encryption.

17. A method comprising:

providing a reader/responder software application program in order to exchange encrypted email between a first user with a licensed email client software and a second user not licensed with said email client software, wherein said second user has a third party email software application program; and providing for installation of said reader/responder software application program by the second user, wherein the second user receives an email with an encrypted message as an attachment from the first user into said third party email software application program of the second user, wherein said third party email software application program is different from said email client software, wherein said reader/responder software application program is adapted to allow the second user without said email client software to read encrypted email created and sent from the first user or another user both of which have said email client software, wherein said reader/responder software application program is adapted to create a new secure email including an encrypted message by the second user to send to at least one of the first user and/or any other user of said licensed email client software, and wherein the second user is not able to create a new secure email message to send to a user that is not a user of said licensed email client software.

18. The method according to claim 17, further comprising:

viewing by the second user said encrypted message using said reader/responder software application program including decoding said encrypted message using a private key for the second user.

19. The method according to claim 17, further comprising:

saving information about the first user into an address book database belonging to the second user along with an unencrypted public key for the first user.

20. The method according to claim 17, wherein said email client software application program uses at least 128-bit public/private encryption.

* * * * *